(12) United States Patent
Chen et al.

(10) Patent No.: US 9,363,535 B2
(45) Date of Patent: Jun. 7, 2016

(54) CODING MOTION DEPTH MAPS WITH DEPTH RANGE VARIATION

(75) Inventors: Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 522 days.

(21) Appl. No.: 13/546,695

(22) Filed: Jul. 11, 2012

(65) Prior Publication Data

US 2013/0022111 A1    Jan. 24, 2013

Related U.S. Application Data

(60) Provisional application No. 61/510,753, filed on Jul. 22, 2011.

(51) Int. Cl.
 *H04N 19/86* (2014.01)
 *H04N 19/597* (2014.01)
 (Continued)

(52) U.S. Cl.
 CPC ............. *H04N 19/86* (2014.11); *H04N 19/46* (2014.11); *H04N 19/50* (2014.11); *H04N 19/51* (2014.11);
 (Continued)

(58) Field of Classification Search
 CPC .................. H04N 19/00545; H04N 19/00569; H04N 19/86; H04N 19/46; H04N 19/50; H04N 19/51; H04N 19/597; H04N 19/61; H04N 19/70; H04N 19/85; H04N 19/10; H04N 19/107; H04N 19/11; H04N 19/523; H04N 19/60; H04N 19/82
 See application file for complete search history.

(56) References Cited

U.S. PATENT DOCUMENTS 6,055,274 A * 4/2000 McVeigh .................. 375/240.16
2008/0247670 A1* 10/2008 Tam ........................ B06T 7/0051
                                                                    382/298

(Continued)

FOREIGN PATENT DOCUMENTS

EP          2387243 A2     11/2011
JP       2011519227 A       6/2011

(Continued)

OTHER PUBLICATIONS

Fehn, Christopher, "Depth-Image-Based Rendering (DIBR), Compression and Transmission for a New Approach on 3D-TV," Stereoscopic Displays and Virtual REality Systems XI, edited by Andrew J. Woods, John O Merritt, Stephen A. Benton, Mark T. Bolas, Proc. of SPIE-IS&T Electronic Imaging, SPIE vol. 5291, 2004, p. 93-104.*

(Continued)

*Primary Examiner* — Thai Tran
*Assistant Examiner* — Christopher T Braniff
(74) *Attorney, Agent, or Firm* — Shumaker & Sieffert, P.A.

(57) ABSTRACT

This disclosure describes techniques for coding 3D video block units. In one example, a video encoder is configured to determine a first real-world depth range for a first depth view component comprising a reference view component, determine a second real-world depth range for a second depth view component comprising a current view component, wherein the current view component is predicted relative to the reference view component, determine a predictive block for a portion of the current view component from the reference view component, adjust values of the predictive block based on a difference between the first real-world depth range and the second real-world depth range, and predict the portion of the current view based on the adjusted values of the predictive block.

46 Claims, 6 Drawing Sheets

(51) Int. Cl.
| | |
|---|---|
| H04N 19/70 | (2014.01) |
| H04N 19/51 | (2014.01) |
| H04N 19/61 | (2014.01) |
| H04N 19/85 | (2014.01) |
| H04N 19/50 | (2014.01) |
| H04N 19/46 | (2014.01) |
| H04N 19/60 | (2014.01) |
| H04N 19/11 | (2014.01) |
| H04N 19/107 | (2014.01) |
| H04N 19/82 | (2014.01) |
| H04N 19/523 | (2014.01) |
| H04N 19/10 | (2014.01) |

(52) U.S. Cl.
CPC ............. *H04N 19/597* (2014.11); *H04N 19/61* (2014.11); *H04N 19/70* (2014.11); *H04N 19/85* (2014.11); *H04N 19/00545* (2013.01); *H04N 19/00569* (2013.01); *H04N 19/10* (2014.11); *H04N 19/107* (2014.11); *H04N 19/11* (2014.11); *H04N 19/523* (2014.11); *H04N 19/60* (2014.11); *H04N 19/82* (2014.11)

(56) References Cited

U.S. PATENT DOCUMENTS

| | | | |
|---|---|---|---|
| 2010/0098157 | A1* | 4/2010 | Yang ................. 375/240.12 |
| 2010/0309286 | A1 | 12/2010 | Chen et al. |
| 2011/0038418 | A1* | 2/2011 | Pandit ................ G06T 9/001 375/240.16 |
| 2011/0044550 | A1 | 2/2011 | Tian et al. |
| 2011/0096832 | A1 | 4/2011 | Zhang et al. |
| 2011/0142138 | A1 | 6/2011 | Tian et al. |
| 2011/0216833 | A1 | 9/2011 | Chen et al. |
| 2011/0222602 | A1 | 9/2011 | Sung et al. |

FOREIGN PATENT DOCUMENTS

| | | | |
|---|---|---|---|
| KR | 20100014552 | A | 2/2010 |
| RU | 2421933 | C2 | 6/2011 |
| RU | 2009110511 | * | 6/2011 |
| WO | 0077734 | A2 | 12/2000 |
| WO | 2008117963 | A1 | 10/2008 |
| WO | 2009091383 | A2 | 7/2009 |
| WO | 2009131703 | A2 | 10/2009 |
| WO | 2010043773 | A1 | 4/2010 |
| WO | 2010079921 | A2 | 7/2010 |
| WO | 2010141927 | A1 | 12/2010 |
| WO | 2010144074 | A1 | 12/2010 |

OTHER PUBLICATIONS

Pourazad et al., "Generating the Depth Map from the Motion Information of H.264-Encoded 2D Video Sequence," EURASIP Journal on Image and Video Processing, vol. 210, pp. 1-13.*

Lee, et al., "A Fast and Efficient Multi-View Depth Image Coding Method Based on Temporal and Inter-View Correlations of Texture Images," IEEE Circuits and Systems Society, IEEE Transactions on Volume: Circuits and Systems for Video Technology, May 2011, pp. 1-11.

"Draft Report on Experimental Framework in 3D Video Coding," MPEG Meeting; Geneva; (Motion Picture Expert Group or ISO/IEC JTC1/SC29/WG11), No. N11478, Jul. 2010, 6 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

International Search Report and Written Opinion—PCT/US2012/046440—ISA/EPO—Oct. 16, 2012, 15 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Krishnamurthy et al., "Compression and transmission of depth maps for image-based rendering," Proceedings 2001 International Conference on Image Processing, ICIP 2001, International Conference on Image Processing, Institute of Electrical and Electronics Engineers, vol. 3, Oct. 7, 2001, 4 pp.

Merkle et al.,"3D Video Coding: An Overview of Present and Upcoming Standards," Visual Communications and Image Processing, vol. 7744, Jul. 14, 2010, 7 pp.

Sullivan et al., "Video Compression-From Concepts to the H.264/AVC Standard," Proceedings of the IEEE, vol. 93, No. 1, Jan. 2005, 14 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

International Preliminary Report on Patentability from international application No. PCT/US2012/046440, mailed Sep. 13, 2013, 9 pp.

Second Written Opinion of international application No. PCT/US2012/046440, mailed Jun. 24, 2013, 8 pp.

Response to Written Opinion dated Oct. 16, 2012, from International Application No. PCT/US2012/046440, filed on May 22, 2013, 21 pp.

Response to Second Written Opinion dated Jun. 26, 2013, from International Application No. PCT/US2012/046440, filed on Aug. 23, 2013, 4 pp.

* cited by examiner

CODING MOTION DEPTH MAPS WITH DEPTH RANGE VARIATION

CLAIM OF PRIORITY

This application is related to and claims priority of U.S. Provisional Application No. 61/510,753, filed Jul. 22, 2011, which is hereby incorporated by reference in its entirety.

TECHNICAL FIELD

This disclosure relates to the field of video coding, e.g., coding 3-dimensional video data.

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, and the like. Digital video devices implement video compression techniques, such as MPEG-2, MPEG-4, or H.264/MPEG-4, Part 10, Advanced Video Coding (AVC), to transmit and receive digital video more efficiently. Video compression techniques perform spatial and temporal prediction to reduce or remove redundancy inherent in video sequences.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

Efforts have been made to develop new video coding standards based on H.264/AVC. One such standard is the scalable video coding (SVC) standard, which is the scalable extension to H.264/AVC. Another standard is the multi-view video coding (MVC), which has become the multiview extension to H.264/AVC. A joint draft of MVC is in described in JVT-AB204, "Joint Draft 8.0 on Multiview Video Coding," 28th JVT meeting, Hannover, Germany, July 2008, available at http://wftp3.1tu.int/av-arch/jvt-site/2008_07_Hannover/JVT-AB204.zip. A version of the AVC standard is described in JVT-AD007, "Editors' draft revision to ITU-T Rec. H.26411SO/IEC 14496-10 Advanced Video Coding—in preparation for ITU-T SG 16 AAP Consent (in integrated form)," 30th JVT meeting, Geneva, CH, February 2009," available from http://wftp3.1tu.int/av-arch/jvt-site/2009_01_Geneva/JVT-AD007.zip. This document integrates SVC and MVC in the AVC specification.

SUMMARY

In general, this disclosure describes techniques for supporting three-dimensional (3D) video coding and rendering. In particular, the techniques of this disclosure relate to coding and decoding 3D video content. The techniques of this disclosure include coding texture information (such as brightness or luminance data and color or chrominance data) as well as a depth map for the texture information. The depth map may be predictively coded using techniques similar to those applied to code texture information, e.g., intra-predictive coding and/or inter-predictive coding. Depth maps coded using inter-predictive coding techniques are referred to herein as "motion depth maps." This disclosure proposes coding motion depth maps that have depth range variations relative to a reference depth map. For example, this disclosure proposes adjusting values of a predictive block based on a difference between a first real-world depth range of a reference depth view component and a second real-world depth range of a current depth view component. For example, values of the predicted depth map may be adjusted according to a pixel value remapping coding process that is performed after motion compensation.

In a 3D codec, a view component of each view of video data in a specific time instance may include a texture view component and a depth view component. The texture view component may include luminance (Y) components and chrominance (Cb and Cr) components, collectively referred to as "texture information" or "texture components." Luminance (brightness) and chrominance (color) components are collectively referred to herein as "texture" components. The depth view component may be from a depth map of an image. In 3D image rendering, depth maps include depth values and can be used for generating virtual views from a provided viewing perspective relative to another view, e.g., a view including texture information. Coded block units, also referred to simply as "coded blocks" in this disclosure, may correspond to macroblocks in ITU-T H.264/AVC (Advanced Video Coding) or coding units of High Efficiency Video Coding (HEVC).

In one aspect, a method of processing video data comprises determining a first real-world depth range for a first depth view component corresponding to a reference view component and determining a second real-world depth range for a second depth view component corresponding to a current view component, wherein the current view component is predicted relative to the reference view component. The method also comprises determining a predictive block for a portion of the current view component from the reference view component. The method further comprises adjusting values of the predictive block based on a difference between the first real-world depth range and the second real-world depth range and predicting the portion of the current view based on the adjusted values of the predictive block.

In another aspect, a device for encoding data comprises a video coder configured to determine a first real-world depth range for a first depth view component comprising a reference view component, determine a second real-world depth range for a second depth view component comprising a current view component, wherein the current view component is predicted relative to the reference view component, determine a predictive block for a portion of the current view component from the reference view component, adjust values of the predictive block based on a difference between the first real-world depth range and the second real-world depth range, and predict the portion of the current view based on the adjusted values of the predictive block.

In another aspect, a computer-readable medium comprises computer-readable storage medium having stored thereon instructions that, when executed, cause a processor of a video coding device to determine a first real-world depth range for a first depth view component corresponding to a reference view component, determine a second real-world depth range for a second depth view component corresponding to a current view component, wherein the current view component is predicted relative to the reference view component, determine a predictive block for a portion of the current view component from the reference view component, adjust values of the predictive block based on a difference between the first real-world depth range and the second real-world depth range, and predict the portion of the current view based on the adjusted values of the predictive block.

In another aspect, a device is provided that comprises means for determining a first real-world depth range for a first depth view component corresponding to a reference view component, means for determining a second real-world depth range for a second depth view component corresponding to a current view component, wherein the current view component is predicted relative to the reference view component, and means for determining a predictive block for a portion of the current view component from the reference view component. The device further comprises means for adjusting values of the predictive block based on a difference between the first real-world depth range and the second real-world depth range and means for predicting the portion of the current view based on the adjusted values of the predictive block.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software comprising instructions to execute the techniques may be initially stored in a computer-readable medium and loaded and executed by a processor.

Accordingly, this disclosure also contemplates computer-readable media comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

This disclosure may also apply to electromagnetic signals carrying information. For example, an electromagnetic signal may comprise information relating to the full pixel support used to interpolate a value for a sub-integer pixel of a reference sample. In some examples, a signal may be generated from or transmitted by a device implementing the techniques described herein. In other examples, this disclosure may apply to signals that may be received at a device implementing the techniques described herein.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
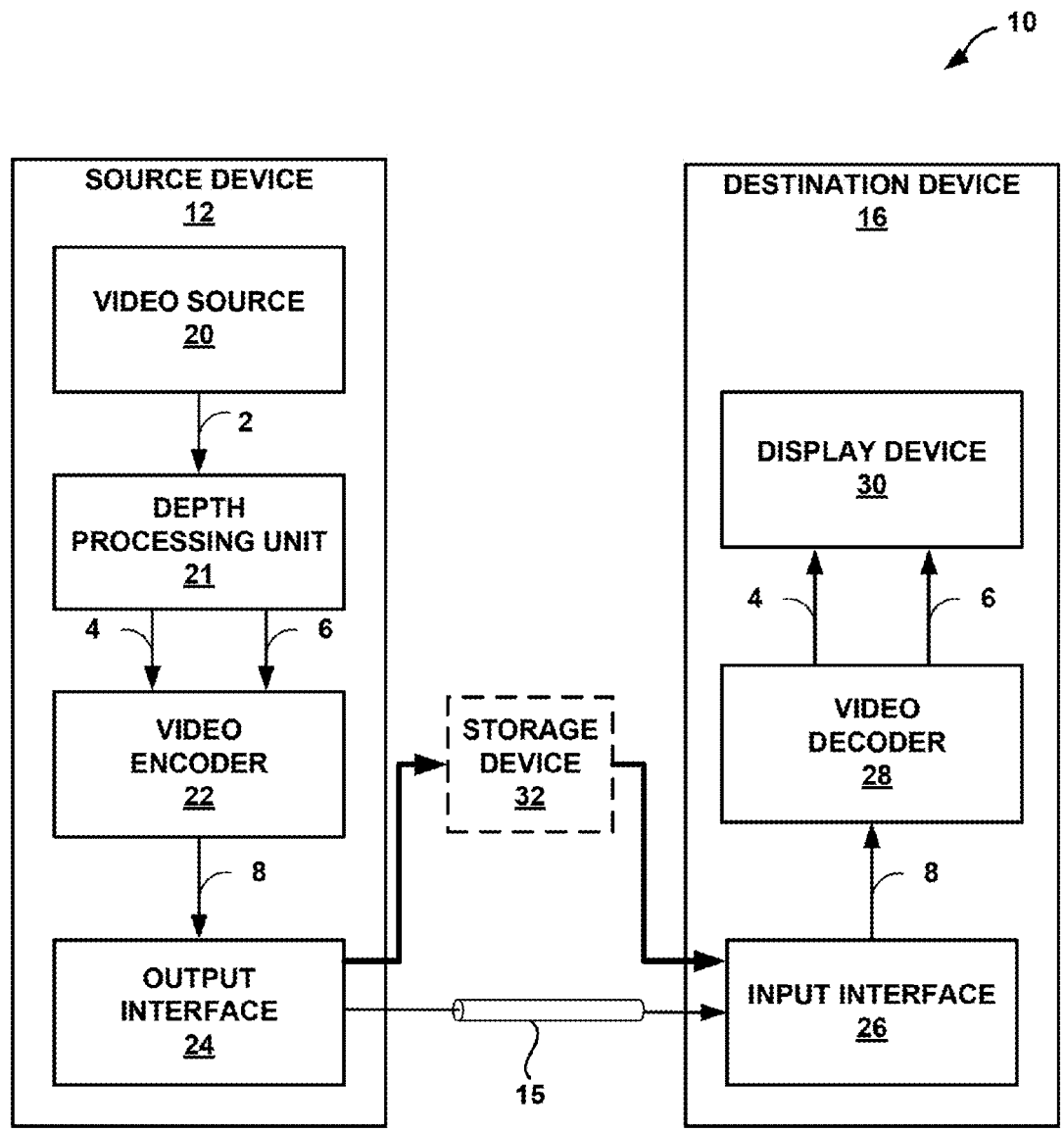
FIG. 1 is a block diagram illustrating one example of a video encoding and decoding system, according to techniques of this disclosure.

This disclosure describes signaling techniques that an encoder may apply and a decoder may use during at least an inter-prediction stage of at least one of a video encoding and decoding process. The described techniques are related to the coding of three-dimensional ("3D") video content. This disclosure proposes coding motion depth maps that have depth range variations relative to reference depth maps. For example, this disclosure proposes adjusting values of a predictive block based on a difference between a first real-world depth range of a reference depth view component and a second real-world depth range of a current depth view component. For example, a pixel value remapping coding process may be performed after motion compensation. These techniques may be applied to encode a bitstream resembling a multiview video coding (MVC) bitstream, where any or all views of the MVC bitstream may further include depth information, in accordance with the techniques of this disclosure. In this disclosure, the term "coding" may refer to either or both of encoding and/or decoding.

More specifically, the techniques involve receipt of at least one two-dimensional image having texture view components and depth view components. Some texture view components and depth view components may be encoded together into a single coded block or as separate blocks. An image may be defined by depth view components and texture view components.

Depth values for an image frame may be defined relative to a depth range particular for that image frame or picture. However, depth view components for different frames may have different depth ranges. Thus, two depth values for two different frames may correspond to different real-world depth values if the depth ranges for the two frames differ. For example, a current view frame and a corresponding reference frame may have the same depth value. However, if the current view frame and its corresponding reference frame have different real-world depth values, the same depth value correspond to different real-world depth values. Techniques described herein code motion depth maps to compensate for these depth value differences between reference views and current views.

Video conversion based on depth estimation and virtual view synthesis may be used to create 3D image, such as 3D video, applications. In particular, virtual views of a scene may be used to create a 3D view of the scene. Generation of a virtual view of a scene based on an existing view of the scene is conventionally achieved by estimating object depth values before synthesizing the virtual view. Depth estimation is the process of estimating absolute or relative distances between objects and the camera plane from stereo pairs or monoscopic content. Depth information may include information useful in forming three-dimensional video, such as a depth map (e.g., depth values on a per-pixel basis) or a parallax map (e.g., horizontal disparity on a per-pixel basis). Depth information may have a range of real-world depth values, referred to as a depth range. Real-world depth values for a picture may be quantized, typically with reference to a depth range, to create a depth map for that picture.

The estimated depth information, usually represented by a grey-level image depth map, can be used to generate arbitrary angle of virtual views using depth image based rendering (DIBR) techniques. Compared to the traditional three-dimensional television (3DTV) systems where multi-view sequences face the challenges of efficient inter-view compression, a depth map based system may reduce the usage of bandwidth by transmitting only one or a few views together with the depth map(s), which can be efficiently encoded. The depth map(s) used in depth map based conversion may be controllable (e.g., through scaling) by end users before it is used in view synthesis. Customized virtual views may be generated with different amounts of perceived depth. Also, an estimation of depth can be performed using monoscopic video wherein only a one view 2D content is available.

Block based inter-coding is a coding technique that relies on temporal prediction to reduce or remove temporal redundancy between video blocks of successive coded units of a video sequence. Inter-coding may be applied to both texture and depth information. The coded units may comprise video frames, slices of video frames, groups of pictures, or another defined unit of encoded video blocks. As used herein, the terms "frame" and "picture" may be used interchangeably. For inter-coding, a video encoder performs motion estimation and motion compensation to estimate motion between video blocks of two or more adjacent coded units. Using techniques for motion estimation, the video encoder generates motion vectors, which may indicate displacement of video blocks relative to corresponding prediction video blocks in one or more reference frames or other coded units. Using techniques for motion compensation, the video encoder may use the motion vectors to generate prediction video blocks from the one or more reference frames or other coded units. After motion compensation, the video encoder may calculate residual video blocks by subtracting prediction video blocks from the original video blocks being coded. Inter-view coding can also be used to predict texture and/or depth information from reference view components of other views, in which displacement vectors may be calculated and used to form predictive blocks relative to the reference view component.

FIG. 1 is a block diagram illustrating one example of a video encoding and decoding system 10 that may be used to implement one or more of the techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, either or both of source device 12 and destination device 16 may comprise wireless communication devices, such as wireless handsets, so-called cellular or satellite radio-telephones, or any wireless devices that can communicate video information over a communication channel 15, in which case communication channel 15 is wireless. The techniques of this disclosure, however, which concern coding blocks of video data that include both texture and depth information, are not necessarily limited to wireless applications or settings. The techniques may also be useful in a wide range of other settings and devices, including devices that communicate via physical wires, optical fibers or other physical or wireless media.

In addition, the encoding or decoding techniques may also be applied in a standalone device that does not necessarily communicate with any other device. For example, video decoder 28 may reside in a digital media player or other device and receive encoded video data via streaming, download or storage media. Hence, the depiction of a source device 12 and destination device 16 in communication with one another is provided for purposes of illustration of an example implementation, and should not be consider limiting as to the techniques described in this disclosure, which may be applicable to video coding in general in a variety of environments, applications or implementations.

In the example of FIG. 1, source device 12 may include a video source 20, depth processing unit 21, video encoder 22, modulator/demodulator (modem) 23, and transmitter 24. Destination device 16 may include a receiver 26, modem 27, video decoder 28, and display device 30. In accordance with this disclosure, video encoder 22 of source device 12 may be configured to apply one or more of the techniques of this disclosure as part of a video encoding process. Similarly, video decoder 28 of destination device 16 may be configured to apply one or more of the techniques of this disclosure as part of a video decoding process.

A video sequence typically includes a series of video frames, also referred to as video pictures. Video encoder 22 operates on video blocks within individual video frames in order to encode the video data. The video blocks may have fixed or varying sizes, and may differ in size according to a specified coding standard. Each video frame includes a series of one or more slices. In the ITU-T H.264 standard, for example, each slice may include a series of macroblocks, which may be arranged into sub-blocks. The H.264 standard supports intra prediction in various block sizes for two dimensional (2D) video encoding, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform (DCT) or a conceptually similar transformation process. These techniques may be extended to 3D video.

Smaller video blocks can provide better resolution, and may be used for locations of a video frame that include high levels of detail. In general, macroblocks and the various sub-blocks may be considered to be video blocks. In addition, a slice may be considered to be a series of video blocks, such as macroblocks and/or sub-blocks. Each slice may be an independently decodable unit of a video frame. Alternatively, frames themselves may be decodable units, or other portions of a frame may be defined as decodable units.

The 2D macroblocks of the ITU-T H.264 standard may be extended to 3D by encoding depth information from a depth map or parallax map together with associated luma and chroma components (that is, texture components) for that video frame or slice. Parallax mapping (also referred to as virtual displacement mapping or offset mapping) displaces texture components at a pixel location based on a function of a view angle and a height map at the pixel location. Video encoder 22 may encode the depth information as monochromatic video.

To encode the video blocks, such as a coded block, video encoder 22 performs intra- or inter-prediction to generate one or more prediction blocks. Video encoder 22 subtracts the prediction blocks from the original video blocks to be encoded to generate residual blocks. Thus, the residual blocks may represent pixel-by-pixel differences between the blocks being coded and the prediction blocks.

Video encoder 22 may also apply transform, quantization, and entropy coding processes to further reduce the bit rate associated with communication of residual blocks. Transform techniques may comprise discrete cosine transforms (DCTs) or conceptually similar processes. Alternatively, wavelet transforms, integer transforms, or other types of transforms may be used. In a DCT process, as an example, a set of pixel values may be converted into transform coefficients, which may represent the energy of the pixel values in the frequency domain.

Video encoder 22 may quantize the transform coefficients, which may generally involve a process that reduces the number of bits associated with the corresponding transform coefficient. Quantization generally refers to a process in which coefficients are quantized to possibly reduce the amount of data used to represent the coefficients. Following quantization, entropy coding may be performed according to an entropy coding methodology. Entropy coding may include one or more processes that collectively compress data for output to a bitstream, where the compressed data may include, for example, a sequence of coding modes, motion information, coded block patterns, and quantized transform coefficients. Examples of entropy coding include, but are not limited to, context adaptive variable length coding (CAVLC) and context adaptive binary arithmetic coding (CABAC). Additional details of an encoding process performed by video encoder 22 are described below with respect to FIG. 2.

A coded video block may be represented by prediction information that can be used to create or identify a predictive block, and a residual block of data that can be applied to the predictive block to recreate the original block. The prediction information may comprise the one or more motion vectors that are used to identify the predictive block of data. Using the motion vectors, video decoder 28 may be able to reconstruct the predictive blocks that were used to code the residual blocks. Thus, given a set of residual blocks and a set of motion vectors (and possibly some additional syntax), video decoder 28 can reconstruct a video frame that was originally encoded. Inter-coding based on motion estimation and motion compensation can achieve relatively high amounts of compression without excessive data loss, because successive video frames or other types of coded units are often similar. An encoded video sequence may comprise blocks of residual data, motion vectors (when inter-prediction encoded), indications of intra-prediction modes for intra-prediction, and syntax elements.

By compensating or remapping pixel values based on depth value ranges, these techniques may improve the process of encoding depth maps. Moreover, the techniques described herein may improve the efficiency of motion compensation. Remapping may be performed for the depth values in a current view after sub-pel motion compensation that used interpolation.

In some examples, video encoder 22 and video decoder 28 conform to the H.264/AVC standard, which uses block motion compensation. In block motion compensation (BMC), frames are partitioned in blocks of pixels. Each block may be predicted from a block of equal size in a reference frame. The blocks may not be transformed in any way apart from being shifted to the position of the predicted block. This shift is represented by a motion vector.

To exploit the redundancy between neighboring block vectors, (e.g., for a single moving object covered by multiple blocks), in some cases only the difference between the current and previous motion vector may be coded in the bit-stream. The result of this differencing process may be mathematically similar to a global motion compensation capable of panning. An entropy coding unit (such as entropy coding unit 46 shown in FIG. 2) may take advantage of the resulting statistical distribution of the motion vectors around the zero vector to reduce the output size.

A block may be shifted by a non-integer number of pixels, which may be referred to as sub-pixel precision. The sub-pixels are in-between full integer pixels and may be generated by interpolating neighboring pixels. Commonly, half-pixel or quarter pixel precision may be used. The computational expense of sub-pixel precision may be higher than full-integer pixel precision due to extra processing required for interpolation. Further, a greater number of potential source blocks are evaluated on the encoder side.

Block motion compensation may introduce discontinuities at the block borders, referred to as blocking artifacts or blockiness artifacts. These blocking artifacts appear in the form of sharp horizontal and vertical edges which may be spotted by the human eye and produce ringing effects (large coefficients in high frequency sub-bands) in the Fourier-related transform used for transform coding of the residual frames.

Block motion compensation divides up a current frame into non-overlapping blocks, and a motion vector provides information for retrieving predicted values for these blocks. Blocks used for reference may overlap in the reference frame (also referred to as a source frame), and thus, need not necessarily occur at block boundaries within the reference frame. Some video compression algorithms assemble the current frame out of pieces of several different previously-transmitted frames.

Frames may also be predicted from future frames, that is, frames that are displayed temporally later than the current frame being coded (although these subsequently displayed frames are coded prior to the current frame, and thus, data for these frames is provided earlier in the bitstream itself). The future frames may be encoded before the predicted frames. Thus, the encoding order does not necessarily match the real frame order. Such frames are usually predicted from two directions, i.e. from the I- or P-frames that immediately precede or follow the predicted frame. These bidirectionally predicted frames are called B-frames. A coding scheme could, for instance, be IBBPBBPBBPBB.

Parameter sets may contain sequence-level header information (in sequence parameter sets—SPS) and the infrequently changing picture-level header information (in picture parameter sets—PPS). With parameter sets, this infrequently changing information needs not to be repeated for each sequence or picture, hence coding efficiency is improved. Furthermore, the use of parameter sets enables out-of-band transmission of the important header information, avoiding the need of redundant transmissions for error resilience. In out-of-band transmission, parameter set NAL units may be transmitted on a different channel than the other NAL units.

Again, the illustrated system 10 of FIG. 1 is merely one example. The various techniques of this disclosure may be performed by any encoding device that supports block-based predictive encoding, or by any decoding device that supports block-based predictive decoding. Source device 12 and destination device 16 are merely examples of such coding devices in which source device 12 generates coded video data for transmission to destination device 16. In some cases, devices 12 and 16 may operate in a substantially symmetrical manner, such that each of devices 12 and 16 include video encoding and decoding components. Hence, system 10 may support one-way or two-way video transmission between video devices 12 and 16, e.g., for video streaming, video playback, video broadcasting, or video telephony.

Video source 20 of source device 12 may include one or more video capture devices, such as video cameras, video archives containing previously captured video, or video feeds from a video content provider. As a further alternative, video source 20 may generate computer graphics-based data as the source video, or a combination of live video, archived video, and/or computer-generated video. In some cases, if video source 20 is a video camera, source device 12 and destination device 16 may form so-called camera phones or video phones, or other mobile devices configured to manipulate video data, such as tablet computing devices. In each case, the captured, pre-captured or computer-generated video may be encoded by video encoder 22. Video source 20 captures a view and provides it to depth processing unit 21. In some examples, depth processing unit 21 is part of video encoder 22.

A depth image may be determined for objects in the view from the view captured by video source 20. Depth processing unit 21 may be configured to automatically calculate depth values for objects in the view. For example, depth processing unit 21 may calculate depth values for objects based on luminance information. Depth processing unit 21 may also determine a depth range for the depth values in the view. The depth range may correspond to the range of a smallest (e.g., closest) real-world depth value to a largest (e.g., farthest) real-world depth value. As used herein, a depth value is denoted as d, while a depth range is denoted as $z_{near}$ to $z_{far}$.

In some examples, depth processing unit 21 is configured to receive depth information from a user. In some examples, video source 20 captures two views of a scene at different perspectives, and then calculates depth information for objects in the scene based on disparity between the objects in the two views. In various examples, video source 20 comprises a standard two-dimensional camera, a two camera system that provides a stereoscopic view of a scene, a camera array that captures multiple views of the scene, or a camera that captures one view plus depth information.

Depth processing unit 21 passes texture view components and depth view components to video encoder 22. Depth processing unit 21 may also pass the view to video encoder 22. The depth view components may be from a depth map image for the view. A depth map may comprise a map of depth values for each region of pixels associated with an area (e.g., block, slice, or frame) to be displayed. A region of pixels may be a single pixel or a group of one or more pixels. Some examples of depth maps have one depth component per pixel. In other examples having sub-pixel precision, multiple depth components are present per pixel. Depth maps may be coded in a fashion substantially similar to texture data, e.g., using intra-prediction or inter-prediction relative to other, previously coded depth data.

In some examples, the depth map is estimated. Stereo matching may be used to estimate depth maps when more than one view is available. However, in 2D to 3D conversion, estimating depth may be more difficult. Nevertheless, depth map estimated by various methods may be used for 3D rendering based on Depth-Image-Based Rendering (DIBR).

Although video source 20 may provide multiple views of a scene, depth processing unit 21 may calculate depth information based on the multiple views and source device 12 may generally transmit one view plus depth information for each view of a scene.

When the view is a digital still picture, video encoder 22 may be configured to encode the view as, for example, a Joint Photographic Experts Group (JPEG) image. When the view is a frame of video data, video encoder 22 may be configured to encode a first view according to a video coding standard such as, for example Motion Picture Experts Group (MPEG), International Organization for Standardization (ISO)/International Electrotechnical Commission (IEC) MPEG-1 Visual, ISO/IEC MPEG-2 Visual, ISO/IEC MPEG-4 Visual, International Telecommunication Union (ITU) H.261, ITU-T H.262, ITU-T H.263, ITU-T H.264/MPEG-4, H.264 Advanced Video Coding (AVC), the upcoming High Efficiency Video Coding (HEVC) standard (also referred to as H.265), or other video encoding standards. Video encoder 22 may include depth view components along with the encoded image to form one or more coded blocks. Video encoder 22 passes the one or more coded blocks to transmitter 24. A coded block may be transferred to receiver 26 in a bitstream including signaling information along with the coded block.

The encoded video information may include texture view components and depth view components. Texture components may include luminance (luma) and chrominance (chroma) components of video information. Luma components generally describe brightness, while chrominance components generally describe hues of color. Depth processing unit 21 may extract depth information from a depth map of the captured view. Video encoder 22 may encode texture view components and depth view components into a single coded block of encoded video data. Likewise, video encoder 22 may encode the block such that motion or intra-prediction mode information for the luma component is reused for the chroma components and the depth component. Video encoder 22 may remap depth values for current views relative to the difference between a depth range of the current view and a depth range of a reference view.

A coded block may be modulated by modem 23 according to a communication standard, e.g., such as code division multiple access (CDMA) or another communication standard, and transmitted to destination device 16 via transmitter 24 and communication channel 15. Modem 23 may include various mixers, filters, amplifiers or other components designed for signal modulation. Transmitter 24 may include circuits designed for transmitting data, including amplifiers, filters, and one or more antennas. In some examples, rather than transmitting over a communication channel, source device 12 stores encoded video data, including blocks having texture and depth components, onto a storage medium, such as a digital video disc (DVD), Blu-ray disc, flash drive, or the like.

Receiver 26 of destination device 16 receives information over communication channel 15, and modem 27 demodulates the information. Like transmitter 24, receiver 26 may include circuits designed for receiving data, including amplifiers, filters, and one or more antennas. In some instances, transmitter 24 and/or receiver 26 may be incorporated within a single transceiver component that includes both receive and transmit circuitry. Modem 27 may include various mixers, filters, amplifiers or other components designed for signal demodulation. In some instances, modems 23 and 27 may include components for performing both modulation and demodulation.

Again, the video encoding process performed by video encoder 22 may implement one or more of the techniques described herein during inter-prediction encoding, which may include motion estimation and motion compensation, and intra-prediction encoding. The video decoding process performed by video decoder 28 may also perform such techniques during a motion compensation stage of the decoding process.

The term "coder" is used herein to refer to a specialized computer device or apparatus that performs video encoding or video decoding. The term "coder" generally refers to any video encoder, video decoder, or combined encoder/decoder (codec). The term "coding" refers to encoding or decoding. The terms "coded block," "coded block unit," or "coded unit" may refer to any independently decodable unit of a video frame such as an entire frame, a slice of a frame, a block of video data, or another independently decodable unit defined according to the coding techniques used.

Display device 30 displays the decoded video data to a user, and may comprise any of a variety of one or more display devices such as a cathode ray tube (CRT), a liquid crystal display (LCD), a plasma display, an organic light emitting diode (OLED) display, or another type of display device. In some examples, display device 30 corresponds to a device capable of three-dimensional playback. For example, display device 30 may comprise a stereoscopic display, which is used in conjunction with eyewear worn by a viewer. The eyewear may comprise active glasses, in which case display device 30 rapidly alternates between images of different views synchronously with alternate shuttering of lenses of the active glasses. Alternatively, the eyewear may comprise passive glasses, in which case display device 30 displays images from different views simultaneously, and the passive glasses may include polarized lenses that are generally polarized in orthogonal directions to filter between the different views.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16.

Video encoder 22 and video decoder 28 may operate according to a video compression standard, such as the ITU-T H.264 standard, alternatively described as MPEG-4, Part 10, Advanced Video Coding (AVC). Additional video compression standards that are based on the ITU H.264/AVC standard that may be used by video encoder 22 and video decoder 28 include the scalable video coding (SVC) standard, which is a scalable extension to the ITU H.264/AVC standard. Another standard with video encoder 22 and video decoder 28 may operate according to includes the multi-view video coding (MVC) standard, which is a multi-view extension to the ITU H.264/AVC standard. The techniques of this disclosure, however, are not limited to any particular video coding standard.

In some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. When any or all of the techniques of this disclosure are implemented in software, an implementing device may further include hardware for storing and/or executing instructions for the software, e.g., a memory for storing the instructions and one or more processing units for executing the instructions. Each of video encoder 22 and video decoder 28 may be included in one or more encoders or decoders, either of which may be integrated as part of a combined codec that provides encoding and decoding capabilities in a respective mobile device, subscriber device, broadcast device, server, or the like.

Efforts are currently in progress to develop a new video coding standard, currently referred to as High Efficiency Video Coding (HEVC). The upcoming standard is also referred to as H.265. The standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-three intra-prediction encoding modes. HEVC may be extended to support the slice header information techniques as described herein.

HM refers to a block of video data as a coding unit (CU). Syntax data within a bitstream may define a largest coding unit (LCU), which is a largest coding unit in terms of the number of pixels. In general, a CU has a similar purpose to a macroblock of H.264, except that a CU does not have a size distinction. A coded block may be a CU according to the HM standard. Thus, a CU may be split into sub-CUs. In general, references in this disclosure to a CU may refer to a largest coding unit (LCU) of a picture or a sub-CU of an LCU. An LCU may be split into sub-CUs, and each sub-CU may be split into sub-CUs. Syntax data for a bitstream may define a maximum number of times an LCU may be split, referred to as CU depth. Accordingly, a bitstream may also define a smallest coding unit (SCU). This disclosure also uses the term "block" to refer to any of a CU, prediction unit (PU), or transform unit (TU).

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. The motion vector may also be treated as having different resolutions for texture view components and depth view components. Data for the CU defining the PU(s) may also describe, for example, partitioning of the CU into one or more PUs. Partitioning modes may differ between whether the CU is not coded, intra-prediction mode encoded, or inter-prediction mode encoded.

A CU having one or more PUs may also include one or more transform units (TUs). Following prediction using a PU, video encoder 22 may calculate a residual value for the portion of the CU corresponding to the PU. The residual value may be transformed, scanned, and quantized. A TU is not necessarily limited to the size of a PU. Thus, TUs may be larger or smaller than corresponding PUs for the same CU. In some examples, the maximum size of a TU may correspond to the size of the corresponding CU.

As noted above, intra-prediction includes predicting a PU of a current CU of a picture from previously coded CUs of the same picture. More specifically, video encoder 22 may intra-predict a current CU of a picture using a particular intra-prediction mode. An HM encoder may be configured with up to thirty-three intra-prediction modes. Therefore, to support a one-to-one mapping between directional intra-prediction modes and directional transforms, HM encoders and decoders would need to store 66 matrices for each supported transform size. Furthermore, the block sizes for which all thirty-three intra-prediction modes are supported may be relatively large blocks, e.g., 32×32 pixels, 64×64 pixels, or even larger.

In destination device 16, video decoder 28 receives the encoded video data. Video decoder 28 entropy decodes the received video data, such as a coded block, according to an entropy coding methodology, such as CAVLC or CABAC, to obtain the quantized coefficients. Video decoder 28 applies inverse quantization (de-quantization) and inverse transform functions to reconstruct the residual block in the pixel domain. Video decoder 28 also generates a prediction block based on control information or syntax information (e.g., coding mode, motion vectors, syntax that defines filter coefficients and the like) included in the encoded video data. Video decoder 28 may calculate a sum of the prediction block and the reconstructed residual block to produce a reconstructed video block for display. Additional details of an example decoding process performed by video decoder 28 are described below with respect to FIG. 5.

As described herein, Y may represent luminance, Cb and Cr may represent two different values of chrominance of a three-dimensional YCbCr color space (e.g., blue and red hues), and d may represent depth information. In some examples, each pixel location may actually define three pixel values for a three-dimensional color space and one pixel value for the depth of the pixel location. In other examples, there may be different numbers of luma components per a chroma component. For example, there may be four luma components per chroma component. Additionally, the depth and texture components may have different resolutions. In such an example, there may not be a one-to-one relationship between texture view components (for example, luma components) and depth view components. Furthermore, depth values between different views may be of different depth ranges. The techniques of this disclosure, however, may refer to prediction with respect to one dimension for purposes of simplicity. To the extent that techniques are described with respect to pixel values in one dimension, similar techniques may be extended to the other dimensions. In particular, in accordance with one aspect of this disclosure, video encoder 22 and/or video decoder 28 may obtain a block of pixels, wherein the block of pixels includes texture view components and depth view components.

In some examples, video encoder 22 and video decoder 28 may use one or more interpolation filtering techniques during motion compensation. That is, video encoder 22 and/or video decoder 28 may apply an interpolation filter to filter support comprising sets of full integer pixel positions.

Video decoder 28 of destination device 16 may receive one or more coded blocks as part of an encoded video bitstream along with additional information, including syntax elements relating to the texture view components. Video decoder 28 may render video data for 3D playback based on the coded block and syntax elements. The syntax elements may be signaled in a slice header. Some syntax elements for the depth view components may be signaled. A flag may be included in the slice level that indicates if remapping is needed to decode a current depth slice. In another example, a different flag may be included in a slice header for each reference view or picture that indicates whether remapping is needed when motion compensation is from that specific reference view or picture. In other examples, the syntax elements may be signaled at the sequence level (e.g., in a sequence parameter set (SPS) data structure), the picture level (e.g., in a picture parameter set (PPS) data structure or frame header), or the block level (e.g., in a block header), in addition to the slice level (e.g., in a slice header).

Figure 2:
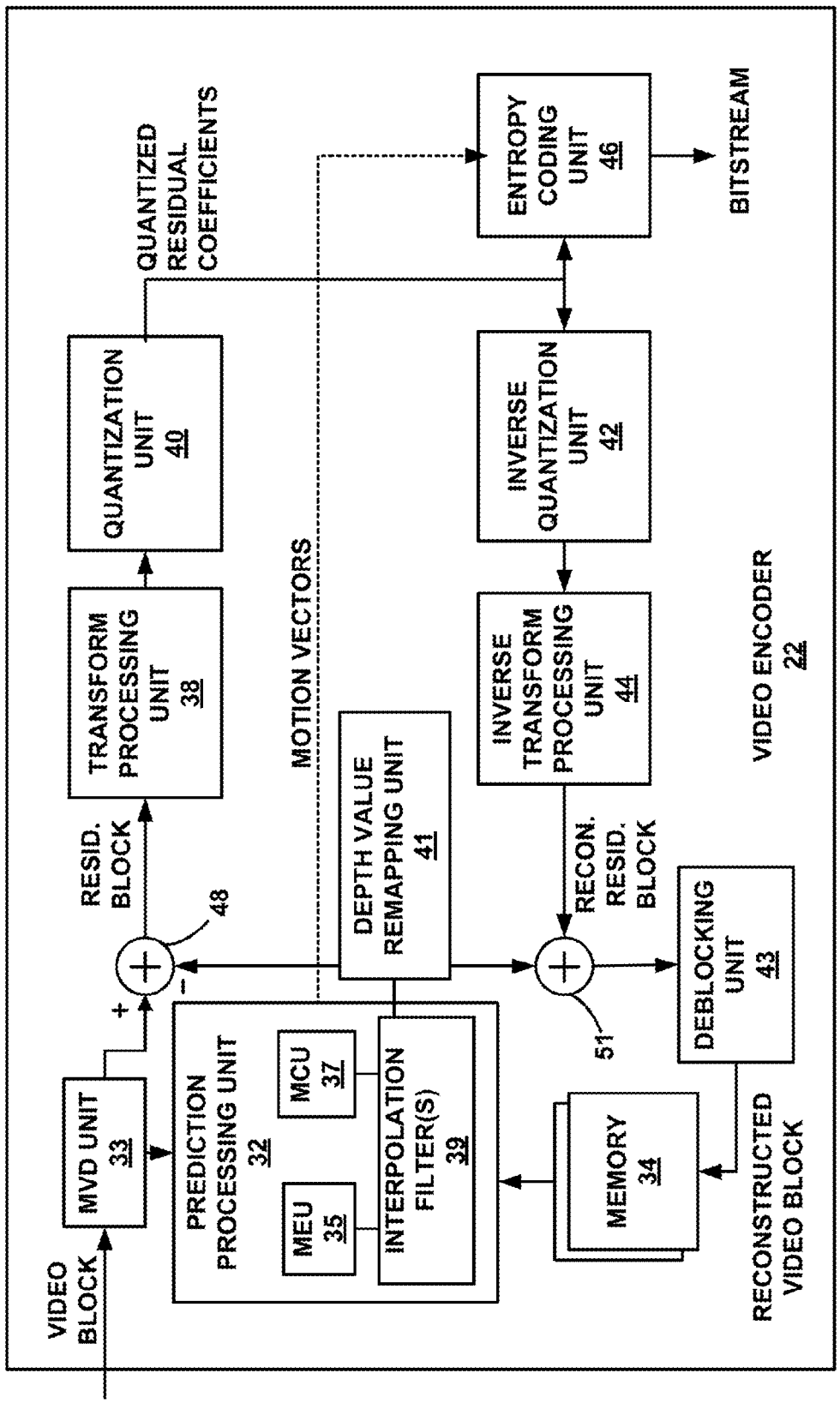
FIG. 2 is a block diagram illustrating an example of the video encoder of FIG. 1 in further detail, according to techniques of this disclosure.

FIG. 2 is a block diagram illustrating an example of the video encoder 22 of FIG. 1 in further detail. Video encoder 22 may encode motion depth maps with differing depth ranges. Video encoder 22 is one example of a specialized video computer device or apparatus referred to herein as a "coder." As shown in FIG. 2, video encoder 22 corresponds to video encoder 22 of source device 12. However, in other examples, video encoder 22 may correspond to a different device. In further examples, other units (such as, for example, other encoder/decoder (CODECS)) can also perform similar techniques to those performed by video encoder 22. As described herein, units or modules are provided to represent functionality and may or may not be separate hardware units, separate software functions, or even separate processes.

Video encoder 22 may perform intra- and inter-coding of blocks within video frames, although intra-coding components are not shown in FIG. 2 for ease of illustration. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to the spatial-based compression mode. Inter-modes such as a prediction (P-mode) or a bi-directional (B-mode) may refer to the temporal based compression modes. The techniques of this disclosure apply during inter-coding and intra-coding. However, for simplicity and ease of illustration, intra-coding units such as a spatial prediction unit are not illustrated in FIG. 2.

As shown in FIG. 2, video encoder 22 receives a video block within a video frame to be encoded. For example, video encoder 22 may receive texture view components and depth view components. In the example of FIG. 2, video encoder 22 includes a prediction processing unit 32, which includes motion estimation unit (MEU) 35 and motion compensation unit (MCU) 37, and one or more interpolation filter 39. Video encoder 22 further includes a multi-view video plus depth (MVD) unit 33, memory 34, a first adder 48, a transform processing unit 38, a quantization unit 40, a depth value remapping (remap) unit 41, and an entropy coding unit 46. For video block reconstruction, video encoder 22 also includes an inverse quantization unit 42, an inverse transform processing unit 44, a second adder 51, and a deblocking unit 43. Video encoder 22 also includes a memory 34 used for storing data, such as a reference frame buffer.

Deblocking unit 43 may be a deblocking filter that filters block boundaries to remove blockiness artifacts from reconstructed video. If included in video encoder 22, deblocking unit 43 would typically filter the output of second adder 51. Deblocking unit 43 may determine deblocking information for the one or more texture components. Deblocking unit 43 may also determine deblocking information for depth map components. In some examples, the deblocking information for the one or more texture components may be different than the deblocking information for a depth map component.

Multi-view video plus depth (MVD) unit 33 receives one or more video blocks (labeled "VIDEO BLOCK" in FIG. 2) comprising texture components and depth information. MVD unit 33 provides functionality to video encoder 22 to encode depth components in a block unit. The MVD unit 33 may provide the texture view components and depth view components, either combined or separately, to prediction processing unit 32 in a format that enables prediction processing unit 32 to process depth information. MVD unit 33 may also determine a real-world depth range for the depth values in each depth view component or frame. In other examples, each unit of video encoder 22, such as prediction processing unit 32, transform processing unit 38, quantization unit 40, entropy coding unit 46, etc., comprises functionality to process depth information in addition to texture view components.

In general, video encoder 22 may encode depth information in a manner similar to chrominance information, in that motion compensation unit 37 may be configured to reuse motion vectors calculated for a luminance component of a block when calculating a predicted value for a depth component of the same block. Similarly, an intra-prediction unit of video encoder 22 may be configured to use an intra-prediction mode selected for the luminance component (that is, based on analysis of the luminance component) when encoding the depth component using intra-prediction.

Prediction processing unit 32 may include a motion estimation (ME) unit 35 and a motion compensation (MC) unit 37. Prediction processing unit 32 may predict depth information for pixel locations as well as for texture components. One or more interpolation filters 39 (referred to herein as "filter 39") may be included in prediction processing unit 32 and may be invoked by one or both of ME unit 35 and MC unit 37 to perform interpolation as part of motion estimation and/or motion compensation. Interpolation filter 39 may actually represent a plurality of different filters to facilitate numerous different types of interpolation and interpolation-type filtering. Thus, prediction processing unit 32 may include a plurality of interpolation or interpolation-like filters.

During the encoding process, video encoder 22 receives a video block to be coded (labeled "VIDEO BLOCK" in FIG. 2), and prediction processing unit 32 performs inter-prediction coding to generate a prediction block (labeled "PREDICTION BLOCK" in FIG. 2). The prediction block may include both texture view components and depth view information. Specifically, ME unit 35 may perform motion estimation to identify the prediction block in memory 34, and MC unit 37 may perform motion compensation to generate the prediction block.

Motion estimation is typically considered the process of generating motion vectors, which estimate motion for video blocks. A motion vector, for example, may indicate the displacement of a prediction block within a prediction or reference frame (or other coded unit, e.g., slice) relative to the block to be coded within the current frame (or other coded unit). The motion vector may have full-integer or sub-integer pixel precision. For example, both a horizontal component and a vertical component of the motion vector may have respective full integer components and sub-integer components. The reference frame (or portion of the frame) may be temporally located prior to or after the video frame (or portion of the video frame) to which the current video block belongs. Motion compensation is typically considered the process of fetching or generating the prediction block from memory 34, which may include interpolating or otherwise generating the predictive data based on the motion vector determined by motion estimation.

ME unit 35 calculates at least one motion vector for the video block to be coded by comparing the video block to reference blocks of one or more reference frames (e.g., a previous and/or subsequent frame). Data for the reference frames may be stored in memory 34. ME unit 35 may perform motion estimation with fractional pixel precision, sometimes referred to as fractional pixel, fractional pel, sub-integer, or sub-pixel motion estimation. In fractional pixel motion estimation, ME unit 35 may calculate a motion vector that indicates displacement to a location other than an integer pixel location. Thus, the motion vector may have fractional pixel precision, e.g., one-half-pixel precision, one-quarter-pixel precision, one-eighth pixel precision, or other fractional pixel precisions. In this manner, fractional pixel motion estimation allows prediction processing unit 32 to estimate motion with higher precision than integer-pixel (or full-pixel) locations, and thus, prediction processing unit 32 may generate a more accurate prediction block. Fractional pixel motion estimation may allow prediction processing unit 32 to predict depth information at a first resolution and to predict the texture components at a second resolution. For example, the texture components may be predicted to a full-pixel precision while the depth information is predicted to one-half-pixel precision. In other examples, other resolutions of the motion vector may be used for depth information and texture components.

ME unit 35 may invoke filter(s) 39 for any necessary interpolations during the motion estimation process. In some examples, memory 34 may store interpolated values for sub-integer pixels, which may be calculated by, e.g., second summer 51 using filter(s) 39. For example, second summer 51 may apply filter(s) 39 to reconstructed blocks that are to be stored in memory 34.

Video encoder 22, such as with depth value remapping ("remap") unit 41, may perform a remapping of a current depth view component based on a difference between the first real-world depth range of the current depth view component and a second real-world depth range of a reference view component. Remap unit 41 may determine a first real-world depth range for a first depth view component comprising a reference view component. Remap unit 41 may also determine a second real-world depth range for a second depth view component comprising a current view component, for example where the current view component is predicted relative to the reference view component. A predictive block for a portion of the current view component from the reference view component may be determined. Based on a difference between the first real-world depth range and the second real-world depth range, values of the predictive block may be adjusted. The values may be adjusted based on a function. The portion of the current view may be coded based on the adjusted values of the predictive block.

In one example, a look-up table containing potential functions may be stored in memory 34. Remap unit 41 may consult the look-up table to select a function for each depth view component or reference view component. In one example, the look-up table includes 256 values for an 8-byte depth map. A linear function may be calculated by checking the look-up table. The function may be applied to the depth range values of the predicted block.

Once prediction processing unit 32 has generated the prediction block or remapped the prediction block, video encoder 22 forms a residual video block (labeled "RESID. BLOCK" in FIG. 2) by subtracting the prediction block from the original video block being coded. This subtraction may occur between texture components in the original video block and texture components in the prediction block, as well as for depth information in the original video block or depth map from depth information in the prediction block. First adder 48 represents the component or components that perform this subtraction operation.

Transform processing unit 38 applies a transform, such as a discrete cosine transform (DCT) or a conceptually similar transform, to the residual block, producing a video block comprising residual transform block coefficients. It should be understood that transform processing unit 38 represents the component of video encoder 22 that applies a transform to residual coefficients of a block of video data, in contrast to a TU of a CU as defined by HEVC. That is, in the example shown in FIG. 2, transform processing unit 38 may be a functional block, not a "TU" in terms of HEVC.

Transform processing unit 38 may, for example, perform other transforms, such as those defined by the H.264 standard, which are conceptually similar to DCT. Such transforms may include, for example, directional transforms (such as Karhunen-Loeve theorem transforms), wavelet transforms, integer transforms, sub-band transforms, or other types of transforms. In any case, transform processing unit 38 applies the transform to the residual block, producing a block of residual transform coefficients. Transform processing unit 38 may apply the same type of transform to both the texture components and the depth information in corresponding residual blocks. There may be separate residual blocks for each texture and depth component. The transform may convert the residual information from a pixel domain to a frequency domain.

Quantization unit 40 quantizes the residual transform coefficients to further reduce bit rate. The quantization process may reduce the bit depth associated with some or all of the coefficients. Quantization unit 40 may quantize a depth image coding residue. Following quantization, entropy coding unit 46 entropy codes the quantized transform coefficients. For example, entropy coding unit 46 may perform CAVLC, CABAC, or another entropy coding methodology.

Entropy coding unit 46 may also code one or more motion vectors and support information obtained from prediction processing unit 32 or other component of video encoder 22, such as quantization unit 40. The one or more prediction syntax elements may include a coding mode, data for one or more motion vectors (e.g., horizontal and vertical components, reference list identifiers, list indexes, and/or motion vector resolution signaling information), an indication of a used interpolation technique, a set of filter coefficients, an indication of the relative resolution of the depth image to the resolution of the luma component, a quantization matrix for the depth image coding residue, deblocking information for the depth image, or other information associated with the generation of the prediction block. These prediction syntax elements may be provided in the sequence level or in the picture level.

The one or more syntax elements may also include a quantization parameter (QP) difference between the luma component and the depth component. The QP difference may be signaled at the slice level. Other syntax elements may also be signaled at a coded block unit level, including a coded block pattern for the depth view component, a delta QP for the depth view component, a motion vector difference, or other information associated with the generation of the prediction block. The motion vector difference may be signaled as a delta value between a target motion vector and a motion vector of the texture components, or as a delta value between the target motion vector (that is, the motion vector of the block being coded) and a predictor from neighboring motion vectors for the block (e.g., a PU of a CU). Following the entropy coding by entropy coding unit 46, the encoded video and syntax elements may be transmitted to another device or archived (for example, in memory 34) for later transmission or retrieval.

Inverse quantization unit 42 and inverse transform processing unit 44 apply inverse quantization and inverse transformation, respectively, to reconstruct the residual block in the pixel domain, e.g., for later use as a reference block. The reconstructed residual block (labeled "RECON. RESID. BLOCK" in FIG. 2) may represent a reconstructed version of the residual block provided to transform processing unit 38. The reconstructed residual block may differ from the residual block generated by first summer 48 due to loss of detail caused by the quantization and inverse quantization operations. Second summer 51 adds the reconstructed residual block to the motion compensated prediction block produced by prediction processing unit 32 to produce a reconstructed video block for storage in memory 34. The reconstructed video block may be used by prediction processing unit 32 as a reference block that may be used to subsequently code a block unit in a subsequent video frame or subsequent coded unit.

In this manner, video encoder 22 represents an example of a video encoder configured to determine a first real-world depth range for a first depth view component comprising a reference view component, determine a second real-world depth range for a second depth view component comprising a current view component, wherein the current view component is predicted relative to the reference view component, determine a predictive block for a portion of the current view component from the reference view component, adjust values of the predictive block based on a difference between the first real-world depth range and the second real-world depth range, and process the portion of the current view based on the adjusted values of the predictive block.

Figure 3:
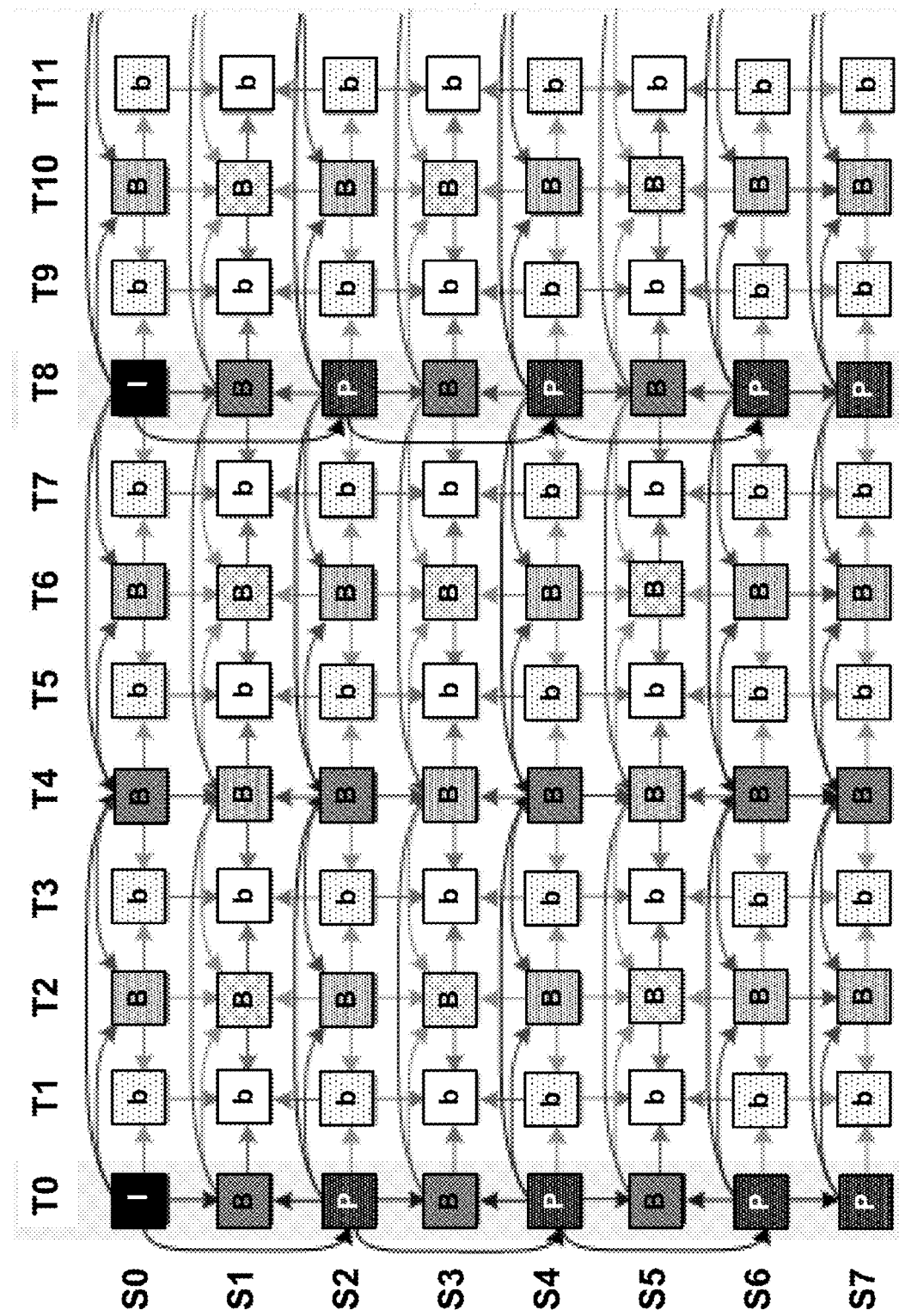
FIG. 3 is a diagram of one example of a MVC prediction structure for multi-view video coding, according to techniques of this disclosure.

FIG. 3 is a diagram of one example of a MVC prediction structure for multi-view video coding. The MVC prediction structure includes both inter-picture prediction within each view and inter-view prediction. In FIG. 3B, predictions are indicated by arrows, where the pointed-to object using the point-from object for prediction reference. Both texture and depth maps may be capable of being inter-view predicted. The MVC prediction structure of FIG. 3 may be used in conjunction with a time-first decoding order arrangement. In a time-first decoding order, each access unit may be defined to contain coded pictures of all the views for one output time instance. The decoding order of access units may not be identical to the output or display order.

In MVC, the inter-view prediction may be supported by disparity motion compensation, which uses the syntax of the H.264/AVC motion compensation, but allows a picture in a different view to be put as a reference picture. Coding of two views could be supported also by MVC. An MVC encoder may take more than two views as a 3D video input and an MVC decoder can decode multi-view representation. A renderer with an MVC decoder may decode 3D video content with multiple views.

In MVC, pictures in the same access unit (i.e., with the same time instance) may be inter-view predicted. When coding a picture in one of the non-base views, a picture may be added into a reference picture list, if it is in a different view but with a same time instance. An inter-view prediction reference picture may be put in any position of a reference picture list, just like any inter prediction reference picture.

In MVC, inter-view prediction may be realized as if the view component in another view is an inter prediction reference. The potential inter-view references may be signaled in the Sequence Parameter Set (SPS) MVC extension. The potential inter-view references may be modified by the reference picture list construction process, which enables flexible ordering of the inter prediction or inter-view prediction references.

A bitstream may be used to transfer multiview video plus depth block units and syntax elements between, for example, source device 12 and destination device 16 of FIG. 1. The bitstream may comply with the coding standard ITU H.264/AVC, and in particular, follows a multi-view video coding (MVC) bitstream structure. That is, the bitstream may conform to the MVC extension of H.264/AVC, in some examples. In other examples, the bitstream may conform to a multiview extension of HEVC or multiview extension of another standard. In still other examples, other coding standards may be used.

A typical MVC bitstream order (decoding order) arrangement is a time-first coding. Each access unit is defined to contain the coded pictures of all the views for one output time instance. The decoding order of access units may or may not be identical to the output or display order. Typically, MVC prediction may include both inter-picture prediction within each view and inter-view prediction. In MVC, the inter-view prediction may be supported by disparity motion compensation, which uses the syntax of the H.264/AVC motion compensation, but allows a picture in a different view to be used as a reference picture.

Coding of two views is supported by MVC. One of the advantages of MVC is that an MVC encoder could take more than two views as a 3D video input and an MVC decoder can decode the two views into a multi-view representation. Thus, a renderer with MVC decoder may treat 3D video content as having multiple views. Previously, MVC did not process depth map input, similar to H.264/AVC with SEI messages (stereo info. or spatial interleaving pictures).

In the H.264/AVC standard, Network Abstraction Layer (NAL) units are defined to provide a "network-friendly" video representation addressing applications such as video telephony, storage, or streaming video. NAL units can be categorized to Video Coding Layer (VCL) NAL units and non-VCL NAL units. VCL units may contain a core compression engine and comprise block, macroblock (MB), and slice levels. Other NAL units are non-VCL NAL units.

For 2D video encoding, each NAL unit may contain a one byte NAL unit header and a payload of varying size. Five bits may be used to specify the NAL unit type. Three bits may be used for nal_ref_idc, which indicates how important the NAL unit is in terms of being referenced by other pictures (NAL units). For example, setting nal_ref_idc equal to 0 means that the NAL unit is not used for inter prediction. As H.264/AVC may be expanded to include 3D video encoding, such as the scalable video coding (SVC) standard, the NAL header may be similar to that of the 2D scenario.

NAL unit headers may also be used for MVC NAL units. However, in MVC, the NAL unit header structure may be retained except for prefix NAL units and MVC coded slice NAL units. MVC coded slice NAL units may comprise a four-byte header and the NAL unit payload, which may include a block unit such as coded block 8 of FIG. 1. Syntax elements in MVC NAL unit header may include priority_id, temporal_id, anchor_pic_flag, view_id, non_idr_flag and inter_view_flag. In other examples, other syntax elements may be included in an MVC NAL unit header.

The syntax element anchor_pic_flag may indicate whether a picture is an anchor picture or non-anchor picture. Anchor pictures and all the pictures succeeding it in the output order (i.e., display order) can be correctly decoded without decoding of previous pictures in the decoding order (i.e., bitstream order) and thus can be used as random access points. Anchor pictures and non-anchor pictures can have different dependencies, both of which may be signaled in the sequence parameter set.

The bitstream structure defined in MVC may be characterized by two syntax elements: view_id and temporal_id. The syntax element view_id may indicate the identifier of each view. This identifier in NAL unit header enables easy identification of NAL units at the decoder and quick access of the decoded views for display. The syntax element temporal_id may indicate the temporal scalability hierarchy or, indirectly, the frame rate. For example, an operation point including NAL units with a smaller maximum temporal_id value may have a lower frame rate than an operation point with a larger maximum temporal_id value. Coded pictures with a higher temporal_id value typically depend on the coded pictures with lower temporal_id values within a view, but may not depend on any coded picture with a higher temporal_id.

The syntax elements view_id and temporal_id in the NAL unit header may be used for both bitstream extraction and adaptation. The syntax element priority_id may be mainly used for the simple one-path bitstream adaptation process. The syntax element inter_view_flag may indicate whether this NAL unit will be used for inter-view predicting another NAL unit in a different view.

MVC may also employ sequence parameter sets (SPSs) and include an SPS MVC extension. Parameter sets are used for signaling in H.264/AVC. Parameter sets may contain sequence-level header information in sequence parameter sets and the infrequently changing picture-level header information in picture parameter sets (PPSs). With parameter sets, this infrequently changing information needs not to be repeated for each sequence or picture, hence coding efficiency is improved. Furthermore, the use of parameter sets enables out-of-band transmission of the header information, avoiding the need of redundant transmissions for error resilience. In some examples of out-of-band transmission, parameter set NAL units may be transmitted on a different channel than the other NAL units. In MVC, a view dependency may be signaled in the SPS MVC extension. All inter-view prediction may be done within the scope specified by the SPS MVC extension.

In some previous 3D video encoding techniques, content is coded in such a way that the color components, e.g., in the YCbCr color space, are coded in one or more NAL units while the depth image is coded in one or more separate NAL units. However, when no single NAL unit contains the coded samples of texture and depth images of an access unit, several problems may occur. For example, in a 3D video decoder, it is expected that after decoding both the texture and depth image of each frame, view rendering based on the depth map and texture is activated to generate the virtual views. If the NAL unit of the depth image and the NAL unit of the texture for an access unit are coded in a sequential manner, view rendering may not begin until the entire access unit is decoded. This may lead increase the time for the 3D video to be rendered.

As described herein, techniques may be added to existing standards, such as MVC, in order to support 3D video. Multiview video plus depth (MVD) may be added to MVC for 3D video processing. The 3D video encoding techniques may provide more flexibility and extensibility to existing video standards, for example, for changing the view angle smoothly or adjusting the convergence or depth perception backward or forward based on the specifications of the devices or user preferences. The coding standards may also be expanded to utilize depth maps for the generation of virtual views in 3D video.

Figure 4:
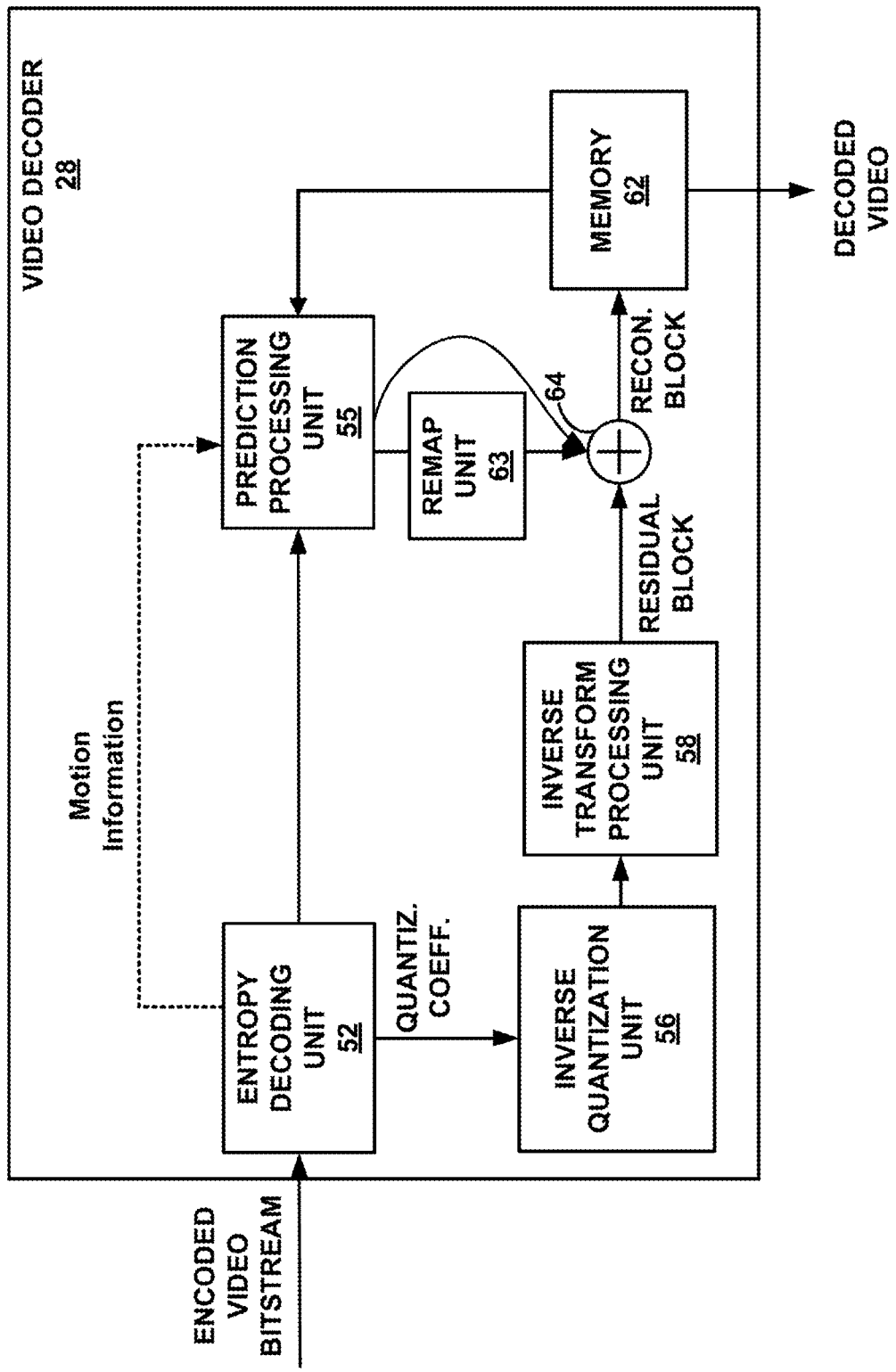
FIG. 4 is a block diagram illustrating an example of the video decoder of FIG. 1 in further detail, according to techniques of this disclosure.

FIG. 4 is a block diagram illustrating an example of a video decoder 28, which may decode a video sequence that is encoded in the manner described herein. Video decoder 28 is one example of a specialized video computer device or apparatus referred to herein as a "coder." As shown in FIG. 3, video decoder 28 corresponds to video decoder 28 of destination device 16. However, in other examples, video decoder 28 may correspond to a different device. In further examples, other units (such as, for example, other encoder/decoder (CODECS)) can also perform similar techniques as video decoder 28.

Video decoder 28 includes an entropy decoding unit 52 that entropy decodes the received bitstream to generate quantized coefficients and the prediction syntax elements. The bitstream may include coded blocks having texture components and corresponding depth components that may be used to render 3D video. The bitstream may also include syntax elements. Prediction syntax elements may include a coding mode, one or more motion vectors, information identifying an interpolation technique used, coefficients for use in interpolation filtering, and/or other information associated with the generation of the prediction block.

The prediction syntax elements, e.g., motion vector data, are forwarded to prediction processing unit 55. Prediction processing unit 55 may use the motion vector data to produce a predicted block for a texture component or a depth component. Prediction processing unit 55 may provide predicted blocks for texture components directly to a summer 64, while prediction processing unit 55 may provide predicted blocks for depth components to remap unit 63. Remap unit 63 may determine differences in real-world depth ranges for a reference frame (or slice) and a current frame (or slice) and adjust values in the predicted value for the depth component accordingly, e.g., using a lookup table or other techniques as described in this disclosure for adjusting depth map predicted values. In this manner, remap unit 63 comprises an example of a unit for adjusting values of a predictive block based on a difference between a first real-world depth range of a reference frame or slice and a second real-world depth range of a current frame or slice being coded.

Prediction processing unit 55 may generate prediction data based on the prediction syntax elements and one or more previously decoded blocks that are stored in memory 62, in much the same way as described in detail above with respect to prediction processing unit 32 of video encoder 22. In particular, prediction processing unit 55 may perform one or more of the multi-view video plus depth techniques of this disclosure during motion compensation to generate a prediction block incorporating depth components as well as texture components. The prediction block (as well as a coded block) may have different resolution for the depth components versus the texture components. For example, the depth components may have quarter-pixel precision while the texture components have full-integer pixel precision. As such, one or more of the techniques of this disclosure may be used by video decoder 28 in generating a prediction block. Prediction processing unit 55 may include a motion compensation unit that comprises filters used for interpolation and interpolation-like filtering techniques of this disclosure. The motion compensation component is not shown in FIG. 4 for simplicity and ease of illustration. These filters may conform substantially to interpolation filters 39 of prediction processing unit 32 (FIG. 2).

Inverse quantization unit 56 inverse quantizes, i.e., de-quantizes, the quantized coefficients. The inverse quantization process may be a process defined for H.264 decoding or for any other decoding standard. Inverse transform processing unit 58 applies an inverse transform, e.g., an inverse DCT or conceptually similar inverse transform process, to the transform coefficients in order to produce residual blocks in the pixel domain. Summer 64 sums the residual block with the corresponding prediction block generated by prediction processing unit 55 to form a reconstructed version of the original block encoded by video encoder 22. If desired, a deblocking filter may also be applied to filter the decoded blocks in order to remove blockiness artifacts. The decoded video blocks are then stored in memory 62, which provides reference blocks for subsequent motion compensation and also produces decoded video to drive display device (such as device 28 of FIG. 1).

The decoded video data may be used to render 3D video. The 3D video may comprise a three dimensional virtual view. That is, a virtual view may be rendered (constructed) using the texture component and the depth component of a view component. Depth information may be used to determine a horizontal offset (horizontal disparity) for each pixel in each block of the view component. Occlusion handling can also be performed to generate the virtual view. Video decoder 28 may provide the decoded texture and depth information to an external unit for rendering of the virtual view.

In this manner, video decoder 28 represents an example of a video decoder configured to determine a first real-world depth range for a first depth view component comprising a reference view component, determine a second real-world depth range for a second depth view component comprising a current view component, wherein the current view component is predicted relative to the reference view component, determine a predictive block for a portion of the current view component from the reference view component, adjust values of the predictive block based on a difference between the first real-world depth range and the second real-world depth range, and process the portion of the current view based on the adjusted values of the predictive block.

Figure 5:
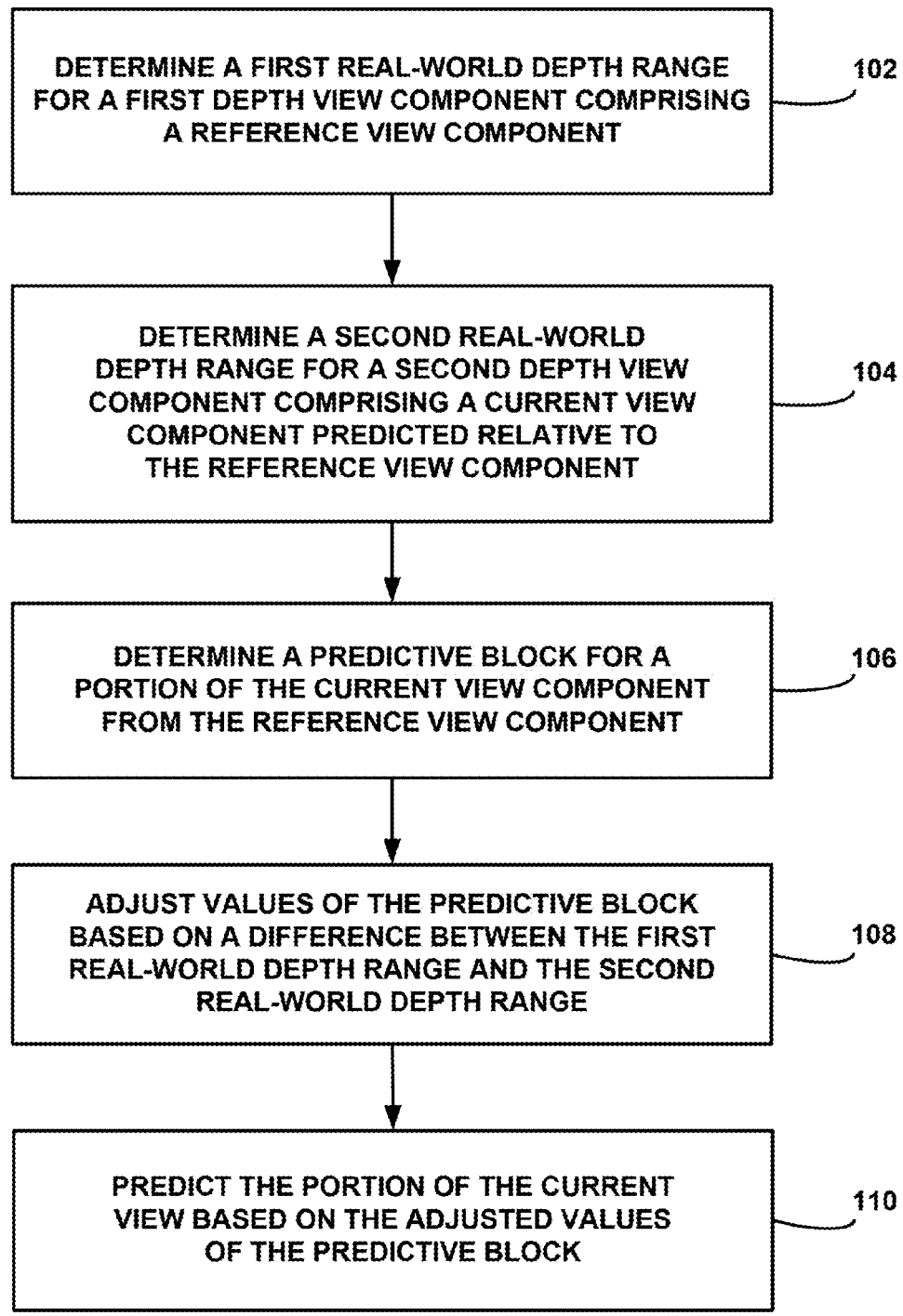
FIG. 5 is a flow diagram illustrating an example operation of a video encoder consistent with this disclosure, according to techniques of this disclosure.

FIG. 5 is a flow diagram illustrating an example operation of a video coder consistent with this disclosure. A video encoder or a video decoder may perform the example method of FIG. 5. A video coder, such as video encoder 22, determines a first real-world depth range for a first depth view component comprising a reference view component (102). The video coder determines a second real-world depth range for a second depth view component comprising a current view component, wherein the current view component is predicted relative to the reference view component (104). A real-world depth range may be directly captured by depth cameras, calculated if the content is generated from 3D model of computer graphics, or estimated from techniques such as disparity estimation.

The video coder may determine a predictive block for a portion of the current view component from the reference view component (106). The predictive block may be determined based on techniques for determining predictive blocks described in H.264/AVC, HEVC, or other video coding standard.

Once the predictive block is determined, depth values of the predictive block may need to be adjusted if the real-world depth range of the depth view components of the reference view differs from the real-world depth range of the depth view components of the current view. The real-world depth range of the depth view components of the reference view may be compared to the real-world depth range of the depth view components of the current view to determine if they differ. In some examples, when the real-world depth ranges differ, the video coder adjusts values of the predictive block based on a difference between the first real-world depth range and the second real-world depth range (108).

The current view may be coded using the values of the adjusted predictive block. The video coder predicts the portion of the current view based on the adjusted values of the predictive block (110).

In an example where the video coder is a video encoder, determining a predictive block may comprise forming a predictive block. Predicting a portion of the current view comprises coding the portion of the current view based on the adjusted values of the predictive block. In another example where the video coder is a video decoder, determining a predictive block comprises receiving a predictive block and processing portion of the current view comprises decoding the portion of the current view based on the adjusted values of the predictive block.

A flag may be provided in a header, such as a slice header, of the predictive block that indicates whether the values of the predictive block were adjusted. A header may be data in a bitstream that provides syntax elements for the coded video block. For example, entropy coding unit 46 (FIG. 2) may provide such a flag, and entropy decoding unit 52 (FIG. 4) may interpret the semantics for the value of the flag. A flag may also be provided in header information that indicates whether a portion of the reference view component that the values of the predictive block determined from the reference view component was adjusted. Adjusting values of the predictive block based on a difference between the first real-world depth range and the second real-world depth range may include applying a function to the values of the predictive block. The function may be a linear function. In some examples, the function includes scaling the depth values of the predictive block and adding an offset to the scaled depth values. The scaling and offset may be related to the first depth range and the second depth range. For example, the amount of scaling and offset may be based on the first or second depth range values. The function may be calculated based on a look-up table comprising values for an eight-byte depth map.

Depth map sequence may be used as a normal video sequence, using existing coding standards, such as H.264/AVC, or HEVC. In 3DV content, depth map sequences might be associated with texture video sequences. A depth map image may contain typically an image with real-world z-value that has been quantized. For example, a depth map image may be quantized to, for example, 8-byte following specific formulae, such as:

$$\frac{1}{z} - \frac{1}{z_{far}} = \frac{d}{255}\left(\frac{1}{z_{near}} - \frac{1}{z_{far}}\right) \quad (1)$$

wherein d is the quantized depth value ranging from 0 to 255 and z is the real-world value ranging from $z_{near}$ to $z_{far}$.

The quantization from real-world depth value to the 8-byte depth value might vary from frame to frame and also view to view since $z_{near}$ to $z_{far}$ may change. Thus, the same depth value in a current frame and its reference frame might correspond to different real-world depth values. Motion compensation efficiency may be reduced when the same depth value in the current frame and the corresponding reference frame apply to different real-world depth values. Furthermore, the same depth value in a current view frame and its inter-view reference frame might correspond to different real-world depth values, so the inter-view prediction might not be efficient.

The remapping may be applied on a pixel-by-pixel basis. In other examples, depth value remapping may be applied to a group of pixels.

Techniques described herein may be applied when there is a real-world depth range variation in the frame level. The depth value remapping decoding process may be introduced after motion compensation. The remapping may be assumed to be a linear function, so that pixel value remapping can be done after sub-pel motion compensation which have been performed using interpolation techniques. The remapping may be generalized to any form of texture prediction, including inter-view depth prediction and any texture prediction among pictures that are quantized to the same dynamic range but from different illumination range. In some examples, the function is determined separately for each video block or other portion of a frame, while in other examples, a single function may be applied to remap an entire frame.

In some examples, a look-up table may be introduced so the function to apply to the current depth view can be calculated by checking a mapping database or look-up table. In one example, a mapping database comprises 256 values for an 8-byte depth map may be accessible by either or both of a video encoder and a video decoder. The mapping database look-up table may be stored internal to a video coder, such as in memory 34 of video encoder 22, or in an external storage accessible by the video coder.

Compared with the traditional video coding platform, a depth value remapping process is proposed according to techniques described herein. Each pixel of the motion compensated block may be mapped to a new value by following a common function for each pixel of the motion compensated block. The techniques may be applicable to any codecs based on motion compensation, thus is applicable to potential extensions for H.264/AVC and HEVC.

To determine a linear remapping function, a pixel with depth z is mapped to d in a reference picture with depth range $[z_{near}^0, z_{far}^0]$ and the current picture has a depth range of $[z_{near}^1, z_{far}^1]$. The d value need to be mapped to $d^1$ for more accurate prediction, wherein Equation (1) becomes:

$$\frac{1}{z} - \frac{1}{z_{far}^1} = \frac{d^1}{255}\left(\frac{1}{z_{near}^1} - \frac{1}{z_{far}^1}\right) \quad (2)$$

Applying the depth range to Equation (2), this results in:

$$\frac{1}{z} - \frac{1}{z_{far}^0} = \frac{d^0}{255}\left(\frac{1}{z_{near}^0} - \frac{1}{z_{far}^0}\right) \quad (3)$$

In order to simplify Equation 3, the following denotations may be made:

$$y = \frac{1}{z} \quad (4)$$

$$y_n^t = \frac{1}{z_{near}^t} \quad (5)$$

$$y_f^t = \frac{1}{z_{far}^t} \quad (6)$$

wherein t=0, 1.

Mapping Equations 4 through 6 to Equation 3 may achieve the following $$d^1 = d\frac{y_n^0 - y_f^0}{y_n^1 - y_f^1} + 255\frac{y_f^0 - y_f^1}{y_n^1 - y_f^1} \quad (7)$$

Note that:

$$d^1 \in \left[\frac{y_n^0 - y_f^0}{y_n^1 - y_f^1}, \frac{y_n^0 - y_f^1}{y_n^1 - y_f^1}255\right] \quad (8)$$

Define the following relationships:

$$\alpha = \frac{y_n^0 - y_f^0}{y_n^1 - y_f^1} \quad (9)$$

$$\beta = 255\frac{y_f^0 - y_f^1}{y_n^1 - y_f^1} \quad (10)$$

Thus, applying Equations 9 and 10 to Equation 7, the remapping function of Equation 1 becomes:

$$f(d) = \alpha \cdot d + \beta \quad (11)$$

In this example, the remapping function is a linear function since $$f(d_i + d_j) = f(d_i) + f(d_j) \quad (12)$$

and $$f(a*d) = a*f(d) \quad (13)$$

Also note the following relationship:

$$\Sigma a_i f(d_i) = f(\Sigma a_i \cdot d_i) \quad (14)$$

Equation 14 indicates the sub-pel motion compensation applied to a remapped reference picture may, in some examples, be equivalent to first doing sub-pel motion compensation and then applying remapping on the compensated signal. The remapping function can be illustrated as follows:

$$f(d) = \frac{\frac{1}{z_{near}^0} - \frac{1}{z_{far}^0}}{\frac{1}{z_{near}^1} - \frac{1}{z_{far}^1}} d + 255 \frac{\frac{1}{z_{far}^0} - \frac{1}{z_{far}^1}}{\frac{1}{z_{near}^1} - \frac{1}{z_{far}^1}} \quad (15)$$

In some examples, calculating the above remapping function for each pixel may be more complex and use more computing resources than is desired. Alternatively, a look-up table may be used instead of calculating the remapping function for each pixel. The look-up table may correspond to a reference picture. The n-th reference picture has a look up table of $LUT^n = \{lut_0^n \ldots lut_{255}^n\}$. Assume the compensated pixel block (size K×L) from the n-th reference picture is an array of Pre={$pre_{i,j}$}, 0≤i<K, 0≤j<L. The remapping process generates the final prediction array FPre={$fpre_{i,j}$} as follows:

$$fpre_{i,j} = lut_{pre_{i,j}}^n, \text{ for each } i,j \quad (16)$$

Note that some of the values in the look-up table can be negative or larger than 255. In such occasions, a 16-bit signed integer may be used to represent the values.

In other examples with quantization functions, the remapping function can be similarly calculated. Two examples are given. In the first example, z-value is proportional to the d value:

$$z_{far} - z = \frac{d}{255}(z_{far} - z_{near}) \quad (17)$$

In the example of Equation 17, the following remapping linear function results:

$$f(d) = \frac{z_{far}^0 - z_{near}^0}{z_{far}^1 - z_{near}^1}d + 255\frac{z_{far}^1 - z_{far}^0}{z_{far}^1 - z_{near}^1} \quad (18)$$

As a second example, the z-value is a look-up table of d values, meaning that, the following two functions are signaled as $z_0(d)$ for the reference picture and $z_1(d)$ for the current picture. Thus, the remapping in this example is as follows:

$$f(d) = z_1^{-1}(z_0(d)) \quad (19)$$

Since both $z_0(d)$ and $z_1(d)$ are monotone functions, the inverse function of $z_1$ can be calculated by searching the $z_1(d)$ function. For example, without loss of generality, both functions may be assumed to be monotone decreasing functions. Given any value d in the range [0, 255], the resulting real-world depth value $\overline{z_0}$ is determined by checking the look-up table corresponding to $z_0(d)$. For example,

```
unsigned char f(unsigned char d) {
    z̄₀= z₀(d);
    if (z̄₀>z₁(0)) return 0;
    for (i=0; i <255; i++)
        if (z̄₀>z₁(i)) return i;
    return 255;
}
```

A flag may be present in a coded bitstream to indicate whether or not a remapping has been performed. The flag may be signaled in the bitstream and set to a first value to indicate a remapping has not been performed and set to a second value, different from the first value, to indicate a remapping has been performed. A flag, such as depth_remap_enabled_flag, may be included in the slice header to indicate if remapping is enabled. For example, when this flag is true, remapping is needed, otherwise, remapping is not needed. In some examples, remapping is not needed, because, for example, there are no depth range changes between the current frame and any reference frame or the depth range changes are below a threshold level of acceptable depth range difference. In another example, a slice header of the predictive block may indicate that a depth range based adjustment of the prediction block is enabled for the coding of one or more blocks of a slice. The slice may include the current view component.

In some examples where remapping is needed for the current picture, there may be a reference picture that has the same or similar depth range to that of the current picture and another reference picture that does not have the same or similar depth range. Thus, when depth_remap_enabled_flag is true, a flag may be introduced in the slice header for each reference picture. This flag indicates if remapping is needed for the specific reference picture and the current picture.

Figure 6:
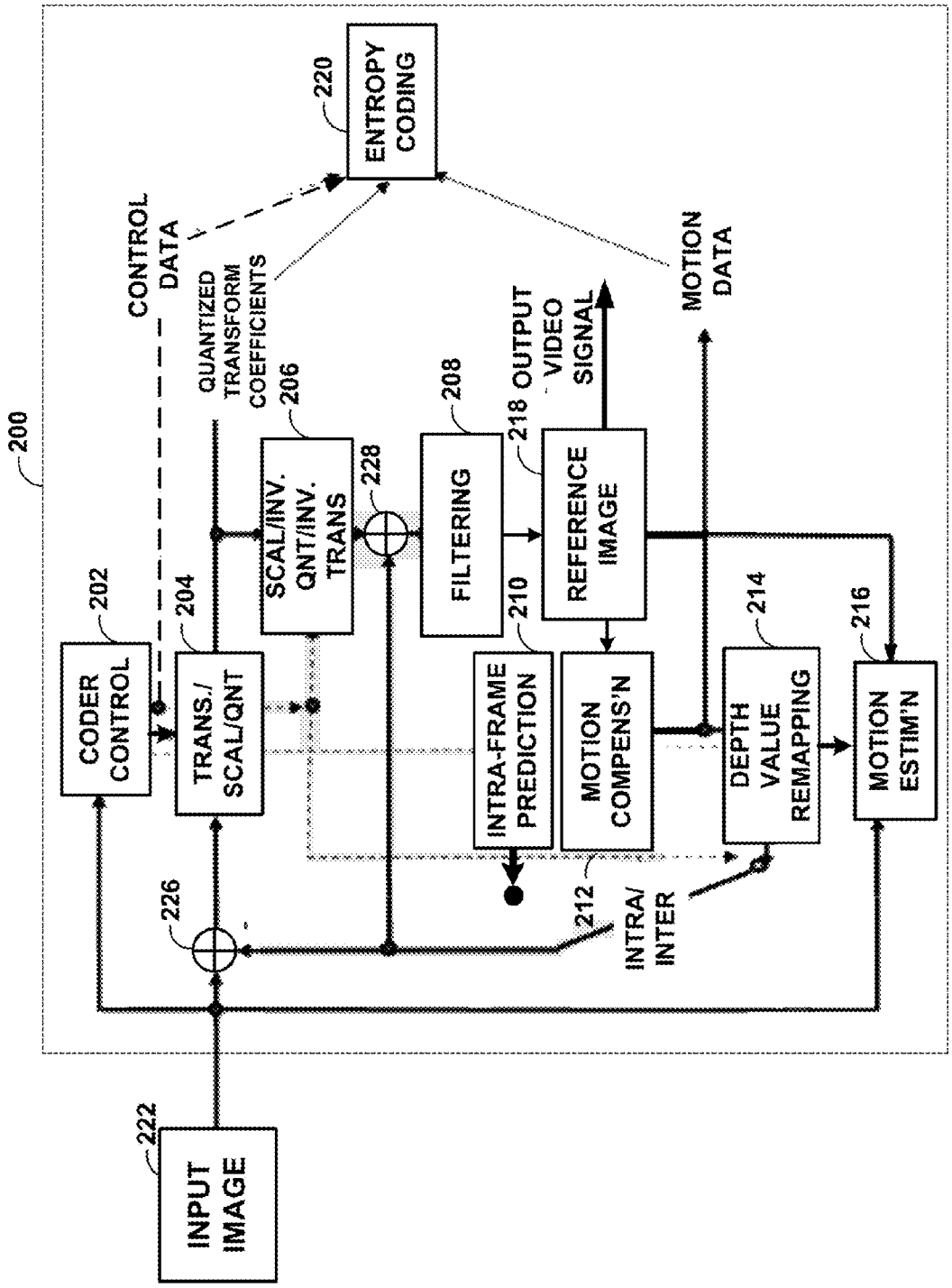
FIG. 6 is a conceptual diagram illustrating an example flow between components of another example coding device for adjusting motion compensated values of depth maps, according to techniques of this disclosure.

FIG. 6 is a conceptual diagram illustrating an example flow between components of another example coding device 200 for adjusting motion compensated values of depth maps. In the example of FIG. 6, coding device 200 includes coder control 202, transform/scaling/quantization unit 204, scale/inverse quantization unit 206, filtering unit 208, intra-frame prediction unit 210, motion compensation unit 212, depth value remapping unit 214, motion estimation unit 216, and entropy coding unit 220. Coding device 200 may represent an encoding device or a decoding device.

Components of coding device 200 that are similarly named to counterpart components of video encoder 22 may conform substantially thereto in terms of functionality. In this example, coding device 200 receives an input image 222, which is a depth map representative of depth values for portions of a corresponding texture image (e.g., a corresponding texture component). Depth values may generally be coded in a manner substantially similar to coding of luminance data without chrominance data, such that intra- and/or inter-prediction may be used to code such depth information. Accordingly, coder control unit 202 determines a coding mode to code input image 222, e.g., intra- or inter-mode.

Assuming without loss of generality that coder control unit 202 selects inter-prediction to encode input image 222, motion estimation unit 216 may calculate a motion vector to be used to predict blocks of input image 222 relative to portions of a previously coded image, represented by reference image 218, which may be stored in a memory (not shown) of coding device 200. Motion estimation unit 216 may provide the calculated motion vector to motion compensation unit 212, which may generate a predicted block for input image 222 using reference image 218. Input image 222 and reference image 218 may have respective real-world depth ranges.

In accordance with the techniques of this disclosure, motion compensation unit 212 may provide the predictive block to depth value remapping unit 214, which may also receive an indication of the respective real-world depth ranges for input image 222 and reference image 218. Moreover, in accordance with these techniques, depth value remapping unit 214 may adjust values of the predictive block received from motion compensation unit 212 based on a difference between the real-world depth range for input image 222 and the real-world depth range for reference image 218.

Depth value remapping unit 214 may adjust values of a predicted block of a depth map using any or all of the techniques of this disclosure. For example, depth value remapping unit 214 may execute a linear function or refer to a look-up table to adjust the values of the predicted block. In some examples, depth value remapping unit 214 (or another unit of coding device 200) may provide an indication (e.g., a flag) in a slice header that is representative of whether depth values for the slice need to be remapped, based on differences between real-world depth ranges for the slice and a reference frame or slice used to predict blocks of the slice.

Intra-frame prediction unit 210 may calculate a predicted block when coder control unit 202 selects intra-prediction. Because intra-prediction involves forming a predicted block from neighboring, previously coded pixels of the same frame, the real-world depth ranges for the predicted block and the reference samples would not ordinarily differ, as they correspond to the same reference frame. However, in cases where different depth ranges are provided within the same frame (or slice), these techniques may also be applied to adjust values of a predicted block resulting from intra-prediction.

The predicted block (which may have been adjusted by depth value remapping unit 214) is provided to summer 226, along with a corresponding (that is, collocated) block from input image 222. Summer 226 calculates a difference between these blocks to produce a residual value, which is transformed, scaled, and quantized by transform/scale/quantization unit 204, producing quantized transform coefficients. Entropy coding unit 220 may entropy encode the quantized transform coefficients, as well as motion vector data or intra-prediction mode information and/or other syntax data for the current block. Likewise, scale/inverse quantization/inverse transform unit 206 may inverse quantize, inverse transform, and scale the quantized transform coefficients to reproduce the residual data. Summer 228 combines the reproduced residual data with the predicted block, which again may have been adjusted by depth value remapping unit 214 in accordance with the techniques of this disclosure. Filtering unit 228 may filter the output of summer 228 and provide potentially filtered output to a memory storing reference images, such as reference image 218, for use as reference for subsequently coded video data.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of this disclosure have been described. These and other examples are within the scope of the following claims.

The invention claimed is:

1. A method of processing video data, the method comprising:
   determining a first perceived depth range for a first depth view component corresponding to a reference view component for a reference view;
   determining a second perceived depth range for a second depth view component corresponding to a current view component for a current view, wherein the current view is a different view from the reference view, and wherein the current view component is predicted relative to the reference view component;
   determining, from the reference view component, a predictive block for a portion of the current view component;
   adjusting depth values of the predictive block based on a difference between the first perceived depth range and the second perceived depth range, wherein the first perceived depth range is defined by the range of $z_{near}^0$ to $z_{far}^0$ where $z_{near}^0$ represents a minimum perceived depth value for the first depth view component, and $z_{far}^0$ represents a maximum perceived depth value for the first depth view component, and wherein the second perceived depth range is defined by the range of $z_{near}^1$ to $z_{far}^1$ where $z_{near}^1$ represents a minimum perceived depth value for the second depth view component, and $z_{far}^1$ represents a maximum perceived depth value for the second depth view component;
   scaling depth values of the predictive block; and
   coding the portion of the current view component based on the adjusted depth values of the predictive block.

2. The method of claim 1, further comprising:
   forming the predictive block.

3. The method of claim 1, further comprising:
   encoding the portion of the current view component based on the adjusted depth values of the predictive block.

4. The method of claim 1, further comprising:
   decoding the portion of the current view component based on the adjusted depth values of the predictive block.

5. The method of claim 1, further comprising:
   coding, in a slice header of the predictive block, an indication that a depth range based adjustment of the prediction block is enabled for coding of one or more blocks of a slice included in the current view component.

6. The method of claim 1, further comprising:
   applying a function to the depth values of the predictive block.

7. The method of claim 1, further comprising:
   adding an offset to the scaled depth values.

8. The method of claim 7, wherein both the scaling and the offset are related to the first perceived depth range and the second perceived depth range.

9. The method of claim 6, further comprising:
   determining the function based on a look-up table comprising values for an eight-byte depth map.

10. The method of claim 6, further comprising:
    applying the function to each pixel in the predictive block, wherein the function is given as $$f(d) = \frac{\hat{z}_{far}^0 - \hat{z}_{near}^0}{\hat{z}_{far}^1 - \hat{z}_{near}^1} d + 255 \frac{\hat{z}_{far}^1 - \hat{z}_{far}^0}{\hat{z}_{far}^1 - \hat{z}_{near}^1}.$$

in which d represents a depth value of the predictive block, and f(d) represents an adjusted depth value of the predicted block.

11. The method of claim 1, further comprising:
    adjusting the depth values of the predictive block when the difference between the first perceived depth range and the second perceived depth range exceeds a threshold level.

12. The method of claim 1, further comprising:
    performing motion compensation on the reference view component; and
    adjusting the depth values of the predictive block after performing the motion compensation on the reference view component.

13. A device for coding video data, the device comprising:
    a memory configured to store the video data; and
    a video coder in communication with the memory, the video coder configured to:
      determine a first perceived depth range for a first depth view component comprising a reference view component for a reference view;
      determine a second perceived depth range for a second depth view component comprising a current view component for a current view, wherein the current view is a different view from the reference view, and wherein the current view component is predicted relative to the reference view component;
      determine, from the reference view component, a predictive block for a portion of the current view component;
      adjust depth values of the predictive block based on a difference between the first perceived depth range and the second perceived depth range, wherein the first perceived depth range is defined by the range of $z_{near}^0$ to $z_{far}^0$ where $z_{near}^0$ represents a minimum perceived depth value for the first depth view component, and $z_{far}^0$ represents a maximum perceived depth value for the first depth view component, and wherein the second perceived depth range is defined by the range of $z_{near}^1$ to $z_{far}^1$ where $z_{near}^1$ represents a minimum perceived depth value for the second depth view component, and $z_{far}^1$ represents a maximum perceived depth value for the second depth view component;

scale depth values of the predictive block; and code the portion of the current view component based on the adjusted depth values of the predictive block.

14. The device of claim 13, wherein the video coder is a video encoder, wherein the video encoder is further configured to:

form the predictive block; and encode the portion of the current view component based on the adjusted depth values of the predictive block.

15. The device of claim 13, wherein the video coder is further configured to:

code, in a slice header of the predictive block, an indication that a depth range based adjustment of the prediction block is enabled for the coding of one or more blocks of a slice included in the current view component.

16. The device of claim 13, wherein the video coder is further configured to:

code, in a slice header for a portion of the reference view component, an indication that the depth values of the predictive block determined from the reference view component have been adjusted.

17. The device of claim 13, wherein the video coder is further configured to:

apply a function to the depth values of the predictive block.

18. The device of claim 13, wherein the video coder is further configured to:

add an offset to the scaled depth values.

19. The device of claim 18, wherein both the scale and the offset are related to the first perceived depth range and the second perceived depth range.

20. The device of claim 17, wherein the video coder is further configured to:

determine the function based on a look-up table comprising values for an eight-byte depth map.

21. The device of claim 17, wherein the video coder is further configured to:

apply the function to each pixel in the predictive block, wherein the function is given as $$f(d) = \frac{z_{far}^0 - z_{near}^0}{z_{far}^1 - z_{near}^1} d + 255 \frac{z_{far}^1 - z_{far}^0}{z_{far}^1 - z_{near}^1}.$$

in which d represents a depth value of the predictive block, and f(d) represents an adjusted depth value of the predicted block.

22. The device of claim 13, wherein the video coder is further configured to:

adjust the depth values of the predictive block when the difference between the first perceived depth range and the second perceived depth range exceeds a threshold level.

23. The device of claim 13, wherein the video coder is further configured to:

perform motion compensation on the reference view component; and adjust the depth values of the predictive block after performance of the motion compensation on the reference view component.

24. A non-transitory computer-readable storage medium having stored thereon instructions that, when executed, cause a processor of a video coding device to:

determine a first perceived depth range for a first depth view component corresponding to a reference view component for a reference view;

determine a second perceived depth range for a second depth view component corresponding to a current view component for a current view, wherein the current view is a different view from the reference view, and wherein the current view component is predicted relative to the reference view component;

determine, from the reference view component, a predictive block for a portion of the current view component;

adjust depth values of the predictive block based on a difference between the first perceived depth range and the second perceived depth range, wherein the first perceived depth range is defined by the range of $z_{near}^0$ to $z_{far}^0$ where $z_{near}^0$ represents a minimum perceived depth value for the first depth view component, and $z_{far}^0$ represents a maximum perceived depth value for the first depth view component, and wherein the second perceived depth range is defined by the range of $z_{near}^1$ to $z_{far}^1$ where $z_{near}^1$ represents a minimum perceived depth value for the second depth view component, and $z_{far}^1$ represents a maximum perceived depth value for the second depth view component;

scale depth values of the predictive block; and code the portion of the current view component based on the adjusted depth values of the predictive block.

25. The non-transitory computer-readable storage medium of claim 24, having stored thereon instructions that, when executed cause the processor of the video coding device to:

form the predictive block; and encode the portion of the current view component based on the adjusted depth values of the predictive block.

26. The non-transitory computer-readable storage medium of claim 24, having stored thereon instructions that, when executed cause the processor of the video coding device to:

code, in a slice header of the predictive block, an indication that a depth range based adjustment of the prediction block is enabled for the coding of one or more blocks of a slice included in the current view component.

27. The non-transitory computer-readable storage medium of claim 24, having stored thereon instructions that, when executed cause the processor of the video coding device to:

apply a function to the depth values of the predictive block.

28. The non-transitory computer-readable storage medium of claim 24, having stored thereon instructions that, when executed cause the processor of the video coding device to:

add an offset to the scaled depth values.

29. The non-transitory computer-readable storage medium of claim 28, wherein both the scaling and the offset are related to the first perceived depth range and the second perceived depth range.

30. The non-transitory computer-readable storage medium of claim 27, having stored thereon instructions that, when executed cause the processor of the video coding device to:

determine the function based on a look-up table comprising values for an eight-byte depth map.

31. The non-transitory computer-readable storage medium of claim 24, having stored thereon instructions that, when executed cause the processor of the video coding device to:
adjust the depth values of the predictive block when the difference between the first perceived depth range and the second perceived depth range exceeds a threshold level.

32. A device for processing video data, the device comprising:
means for storing the video data;
means for determining a first perceived depth range for a first depth view component corresponding to a reference view component for a reference view;
means for determining a second perceived depth range for a second depth view component corresponding to a current view component for a current view, wherein the current view is a different view from the reference view, and wherein the current view component is predicted relative to the reference view component;
means for determining, from the reference view component, a predictive block for a portion of the current view component;
means for adjusting depth values of the predictive block based on a difference between the first perceived depth range and the second perceived depth range, wherein the first perceived depth range is defined by the range of $z_{near}^0$ to $z_{far}^0$ where $z_{near}^0$ represents a minimum perceived depth value for the first depth view component, and $z_{far}^0$ represents a maximum perceived depth value for the first depth view component, and wherein the second perceived depth range is defined by the range of $z_{near}^1$ to $z_{far}^1$ where $z_{near}^1$ represents a minimum perceived depth value for the second depth view component, and $z_{far}^1$ represents a maximum perceived depth value for the second depth view component;
means for scaling depth values of the predictive block; and
means for coding the portion of the current view component based on the adjusted depth values of the predictive block.

33. The device of claim 32, further comprising:
means for forming the predictive block, and
means for encoding the portion of the current view component based on the adjusted depth values of the predictive block.

34. The device of claim 32, further comprising:
means for coding, in a slice header of the predictive block, an indication that a depth range based adjustment of the prediction block is enabled for the coding of one or more blocks of a slice included in the current view component.

35. The device of claim 32, further comprising:
means for applying a function to the depth values of the predictive block.

36. The device of claim 32, further comprising:
means for adding an offset to the scaled depth values.

37. The device of claim 36, wherein both the scaling and the offset are related to the first perceived depth range and the second perceived depth range.

38. The device of claim 35, further comprising:
means for determining the function based on a look-up table comprising values for an eight-byte depth map.

39. The device of claim 35, further comprising:
means for applying the function to each pixel in the predictive block, wherein the function is given as $$f(d) = \frac{z_{far}^0 - z_{near}^0}{z_{far}^1 - z_{near}^1} d + 255 \frac{z_{far}^1 - z_{far}^0}{z_{far}^1 - z_{near}^1}.$$

in which d represents a depth value of the predictive block, and f(d) represents an adjusted depth value of the predicted block.

40. The device of claim 32, further comprising:
means for adjusting the depth values of the predictive block when the difference between the first perceived depth range and the second perceived depth range exceeds a threshold level.

41. The device of claim 13, further comprising a camera in communication with the video coder, wherein the video coder is a video encoder and the camera is configured to capture the video data.

42. The device of claim 13, further comprising a display in communication with the video coder, wherein the video coder is a video decoder and the display is configured to display decoded video data.

43. The device of claim 13, wherein the video decoding device comprises at least one of:
an integrated circuit, a microprocessor, a digital signal processor (DSP), a field programmable gate array (FPGA), a desktop computer, a laptop computer, a tablet computer, a wireless communication device, a phone, a television, a camera, a display device, a digital media player, a video game console, a video game device, or a video streaming device.

44. The device of claim 32, further comprising:
means for capturing the video data.

45. The device of claim 32, further comprising:
means for displaying decoded video data.

46. The device of claim 32, wherein the device comprises at least one of:
an integrated circuit, a microprocessor, a digital signal processor (DSP), a field programmable gate array (FPGA), a desktop computer, a laptop computer, a tablet computer, a wireless communication device, a phone, a television, a camera, a display device, a digital media player, a video game console, a video game device, or a video streaming device.

* * * * *